United States Patent
Sakano et al.

(10) Patent No.: US 10,760,986 B2
(45) Date of Patent: Sep. 1, 2020

(54) DISPLACEMENT DETECTION TYPE SIX-AXIS FORCE SENSOR

(71) Applicant: FANUC CORPORATION, Yamanashi (JP)

(72) Inventors: Tetsuro Sakano, Yamanashi (JP); Shunichi Odaka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/200,649

(22) Filed: Nov. 27, 2018

(65) Prior Publication Data

US 2019/0162612 A1 May 30, 2019

(30) Foreign Application Priority Data

Nov. 28, 2017 (JP) ................................ 2017-227878

(51) Int. Cl.
  *G01L 5/165* (2020.01)
  *G01L 1/14* (2006.01)

(52) U.S. Cl.
  CPC .............. *G01L 5/165* (2013.01); *G01L 1/142* (2013.01)

(58) Field of Classification Search
  CPC ................................ G01L 5/165; G01L 1/142
  USPC ....................................... 73/862.041–862.046
  See application file for complete search history.

(56) References Cited

U.S. PATENT DOCUMENTS

| 7,437,954 B2* | 10/2008 | Sakano | G01L 5/161 73/862.043 |
| 7,594,445 B2* | 9/2009 | Hirabayashi | G01L 1/26 73/862.041 |
| 2016/0091376 A1* | 3/2016 | Sakano | G01L 5/165 73/862.043 |
| 2019/0360879 A1* | 11/2019 | Iwatake | G01L 1/142 |

FOREIGN PATENT DOCUMENTS

| EP | 3136069 A1 | 3/2017 |
| JP | H8-136373 A | 5/1996 |
| JP | 2004-301731 A | 10/2004 |
| JP | 2008-20256 A | 1/2008 |
| JP | 2010-210461 A | 9/2010 |
| JP | 2012-145497 A | 8/2012 |

(Continued)

*Primary Examiner* — Octavia Hollington
(74) *Attorney, Agent, or Firm* — Hauptman Ham, LLP

(57) ABSTRACT

A displacement detection type six-axis force sensor. The force sensor includes a first end portion; a second end portion; an intermediate portion; a first connecting portion elastically connecting the first end portion to the intermediate portion with first three-degrees of freedom; a second connecting portion elastically connecting the second end portion to the intermediate portion with second three-degrees of freedom; a first detecting part detecting relative displacement between the first end and intermediate portions, accompanied by elastic deformation of the first connecting portion; and a second detecting part detecting relative displacement between the second end and intermediate portions, accompanied by elastic deformation of the second connecting portion. The intermediate portion and the first and second connecting portions are disposed such that a force applied to the first or second end portion is applied to both of the first and second connecting portions without propagating through the intermediate portion.

8 Claims, 12 Drawing Sheets

(56) References Cited

FOREIGN PATENT DOCUMENTS

| | | |
|---|---|---|
| JP | 2015-55473 A | 3/2015 |
| JP | 2016-70824 A | 5/2016 |
| JP | 2016-156800 A | 9/2016 |
| WO | 2004/063693 A1 | 7/2004 |

* cited by examiner

DISPLACEMENT DETECTION TYPE SIX-AXIS FORCE SENSOR

RELATED APPLICATIONS

The present application claims priority of Japanese Application Number 2017-227878, filed on Nov. 28, 2017, the disclosure of which is hereby incorporated by reference herein in its entirety.

BACKGROUND OF THE INVENTION

1. Field of the Invention

The present invention relates to a displacement detection type six-axis force sensor.

2. Description of the Related Art

A displacement detection type force sensor is configured to detect, when a force (or load) is applied to a sensor body, a displacement of the sensor body accompanied by the deformation of the sensor body caused by the applied force and thereby detect the force based on the detected displacement amount. For example, Japanese Unexamined Patent Publication No. 2004-301731 (JP 2004-301731 A) discloses a force sensor which detects a displacement amount by detecting a change in capacitance provided at a predetermined position on a sensor body. The force sensor includes an outer box-shaped structure and an inner box-shaped structure. The side and top surfaces of the outer box-shaped structure are opposed to the side and top surfaces of the inner box-shaped structure, respectively, and a gap is formed therebetween so as to continuously extend throughout the sensor body. A plurality of pairs of electrodes are respectively arranged at predetermined locations in the gap in such a manner that the electrodes of each pair are opposed to each other in a direction of any one axis of a three-axis rectangular coordinate system, so as to form capacitance between the opposing electrodes of each pair (i.e., to form a capacitor). When the outer box-shaped structure is deformed by a force (or load), the shape and dimensions of the gap change correspondingly, and the capacitance between the respective opposing electrodes changes. The force sensor is configured to calculate, from the change in capacitance, a displacement amount of the outer box-shaped structure relative to the inner box-shaped structure, and detect, based on the calculated displacement amount, a force component in a direction of each axis and a moment component about each axis, of the force applied to the outside box-shaped structure.

On the other hand, Japanese Unexamined Patent Publication No. 2016-070824 (JP 2016-070824 A) discloses a displacement detection type six-axis force sensor configured to detect, in a three-axis rectangular coordinate system, a force component in a direction of each axis and a moment component about each axis, wherein a first detecting part and a second detecting part detect the force and moment components in a sharing manner, with the first detecting part being allocated to three axes and the second detecting part being allocated to the other three axes.

SUMMARY OF INVENTION

In a displacement detection type six-axis force sensor, there is a demand for making it possible to exactly detect a force component in the direction of each axis and a moment component about each axis while eliminating an influence between the axes, and thereby detect with high precision the magnitude and direction of a force applied to the sensor.

One aspect of the present disclosure provides a six-axis force sensor comprising a first end portion; a second end portion; an intermediate portion between the first end portion and the second end portion; a first connecting portion that elastically connects the first end portion to the intermediate portion with first three-degrees of freedom; a second connecting portion that elastically connects the second end portion to the intermediate portion with second three-degrees of freedom; a first detecting part that detects a relative displacement between the first end portion and the intermediate portion, accompanied by elastic deformation of the first connecting portion, and outputs, based on the said relative displacement, a first detection value used for acquiring a first force component in a direction of a first axis, a second force component in a direction of a second axis orthogonal to the first axis, and a third moment component about a third axis orthogonal to both of the first axis and the second axis, of a force applied to the first end portion or the second end portion; and a second detecting part that detects a relative displacement between the second end portion and the intermediate portion, accompanied by elastic deformation of the second connecting portion, and outputs, based on the said relative displacement, a second detection value used for acquiring a first moment component about the first axis, a second moment component about the second axis, and a third force component in a direction of the third axis, of the said force; wherein the intermediate portion, the first connecting portion and the second connecting portion are disposed in such a manner that the said force is applied to both of the first connecting portion and the second connecting portion without propagating through the intermediate portion between the first connecting portion and the second connecting portion.

According to the six-axis force sensor of the above aspect, the first detecting part and the second detecting part can respectively output, in a sharing manner, the first detection value based on the relative displacement in the first three-degrees of freedom between the first end portion and the intermediate portion and the second detection value based on the relative displacement in the second three-degrees of freedom between the second end portion and the intermediate portion, and thereby it is possible to improve accuracy in the first detection value and the second detection value, used for acquiring the six-axis force and moment components. In particular, the six-axis force sensor has a configuration in which the force applied to the first end portion or the second end portion, is applied to both of the first connecting portion and the second connecting portion without propagating through the intermediate portion between the first connecting portion and second connecting portion, so that it is possible to eliminate the influence of a load exerted on the intermediate portion due to the displacement of the first end portion or the second end portion, and thereby output the first detection value and the second detection value with high precision.

BRIEF DESCRIPTION OF THE DRAWINGS

The objects, features and advantages of the present disclosure will become more apparent from the following description of the embodiments in connection with the accompanying drawings, wherein.

DETAILED DESCRIPTION

Figure 1:
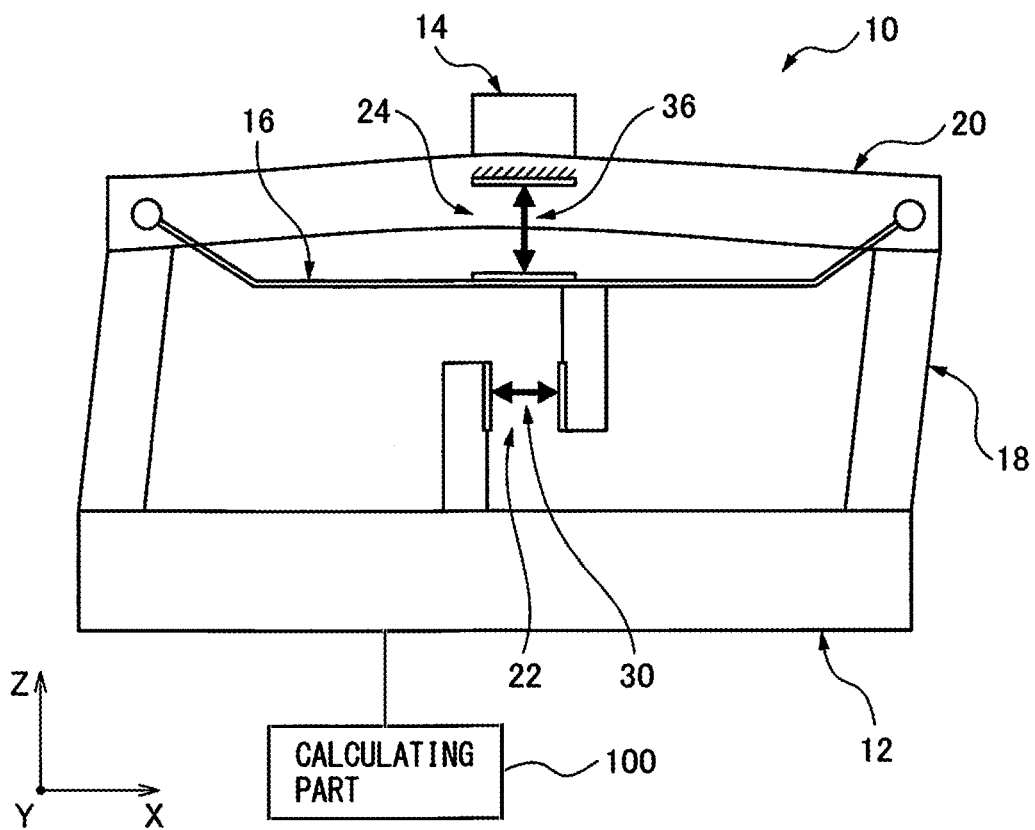
FIG. 1 is a front view conceptually and schematically illustrating a configuration of a six-axis force sensor.

Embodiments of the present disclosure will be described below with reference to the accompanying drawings. The same reference numerals denote corresponding components throughout the drawings.

FIG. 1 conceptually and schematically illustrates a configuration of a six-axis force sensor 10 according to the present disclosure. The six-axis force sensor 10 includes a first end portion 12; a second end portion 14; an intermediate portion 16 between the first end portion 12 and the second end portion 14; a first connecting portion 18 which elastically connects the first end portion 12 to the intermediate portion 16 with first three-degrees of freedom; a second connecting portion 20 which elastically connects the second end portion 14 to the intermediate portion 16 with second three-degrees of freedom; a first detecting part 22 which detects a relative displacement between the first end portion 12 and the intermediate portion 16, the relative displacement accompanied by the elastic deformation of the first connecting portion 18; and a second detecting part 24 which detects a relative displacement between the second end portion 14 and the intermediate portion 16, the relative displacement accompanied by the elastic deformation of the second connecting portion 20.

Each of the first end portion 12 and the second end portion 14 may be configured as a base element that is directly or indirectly fixed to a machine or structure such as a robot arm (not illustrated; hereinafter referred to as a machinery) when the force sensor 10 is mounted on the machinery. Each of the first end portion 12 and the second end portion 14 may also be configured as a force receiving element that is attached to an object such as a robot hand (not illustrated; hereinafter referred to as a force generator) generating a force (or load) to be detected by the force sensor 10, and receives the force to be detected. The force sensor 10 can be used in such a manner that one of the first end portion 12 and the second end portion 14 is arranged as the base element and the other is arranged as the force receiving element.

For example, in a case where the first end portion 12 is used as the base element and the second end portion 14 is used as the force receiving element, the force (or load) applied from the force generator to the second end portion 14 is then applied from the second end portion 14 to the second connecting portion 20. The applied force elastically deforms the second connecting portion 20, and at the same time, causes the second end portion 14 to be elastically displaced relative to the intermediate portion 16 in a direction defined as the second three-degrees of freedom. In addition, the force (or load) applied from the second end portion 14 to the second connecting portion 20 is then applied from the second connecting portion 20 to the first connecting portion 18. The applied force elastically deforms the first connecting portion 18, and at the same time, causes the intermediate portion 16 to be elastically displaced relative to the first end portion 12 in a direction defined as the first three-degrees of freedom. Thus, in the six-axis force sensor 10, the intermediate portion 16, the first connecting portion 18 and the second connecting portion 20 are disposed in such a manner that the force applied to the first end portion 12 or the second end portion 14 is then applied to both of the first connecting portion 18 and the second connecting portion 20 without propagating through the intermediate portion 16 between the first connecting portion 18 and the second connecting portion 20.

For example, in a configuration wherein a three-axis rectangular coordinate system (X-Y-Z) is defined in space as illustrated in the several drawings, the first end portion 12 and the intermediate portion 16 are configured in such a manner as to be able to relatively move in a direction along a first axis (or X axis), relatively move in a direction along a second axis (or Y axis), and relatively rotate about a central axis along a third axis (or Z axis), while accompanied by the elastic deformation of the first connecting portion 18. In this configuration, the first three-degrees of freedom are defined by a movement in the direction along each of the first (X) and second (Y) axes and a rotation about the central axis along the third (Z) axis. The first end portion 12 and the intermediate portion 16 can be displaced relative to each other in any one direction or in a combination of two or more directions, from among the above three directions, depending on the force applied to the first end portion 12 or the second end portion 14.

Similarly, in a configuration wherein a three-axis rectangular coordinate system (X-Y-Z) is defined in space, the second end portion 14 and the intermediate portion 16 are configured in such a manner as to be able to relatively rotate about a central axis along a first axis (or X axis), relatively rotate about a central axis along a second axis (or Y axis), and relatively move in a direction along a third axis (or Z axis), while accompanied by the elastic deformation of the second connecting portion 20. In this configuration, the second three-degrees of freedom are defined by a rotation about the central axis along each of the first (X) and second (Y) axes and a movement in the direction along the third (Z)

axis. The second end portion 14 and the intermediate portion 16 can be displaced relative to each other in any one direction or in a combination of two or more directions, from among the above three directions, depending on the force applied to the first end portion 12 or the second end portion 14.

It should be noted that, in the present disclosure, the expression "along . . . " is a term for representing an approximate directionality by using any one of axes of a coordinate system, and covers a configuration as to be parallel to an axis, a configuration as to slightly deviate from the parallel configuration (i.e., substantially parallel to an axis), and a configuration as to intersect an axis at, e.g., 45 degrees or less angle.

The first detecting part 22 detects a relative displacement (or an amount of displacement due to a relative motion) between the first end portion 12 and the intermediate portion 16 in connection with the aforementioned three directions. The first detecting part 22 outputs, based on the detected relative displacement in three directions, a first detection value D1 used for acquiring a first force component in the direction of a first axis (X axis, in the drawing), a second force component in the direction of a second axis (Y axis, in the drawing) orthogonal to the first axis, and a third moment component about a third axis (Z axis, in the drawing) orthogonal to both of the first axis and the second axis, of the force applied to the first end portion 12 or the second end portion 14.

The second detecting part 24 detects a relative displacement (or an amount of displacement due to a relative motion) between the second end portion 14 and the intermediate portion 16 in connection with the aforementioned three directions. The second detecting part 24 outputs, based on the detected relative displacement in three directions, a second detection value D2 used for acquiring a first moment component about a first axis (X axis, in the drawing), a second moment component about a second axis (Y axis, in the drawing) orthogonal to the first axis, and a third force component in the direction of a third axis (Z axis, in the drawing) orthogonal to both of the first axis and the second axis, of the force applied to the first end portion 12 or the second end portion 14.

Figure 2A:
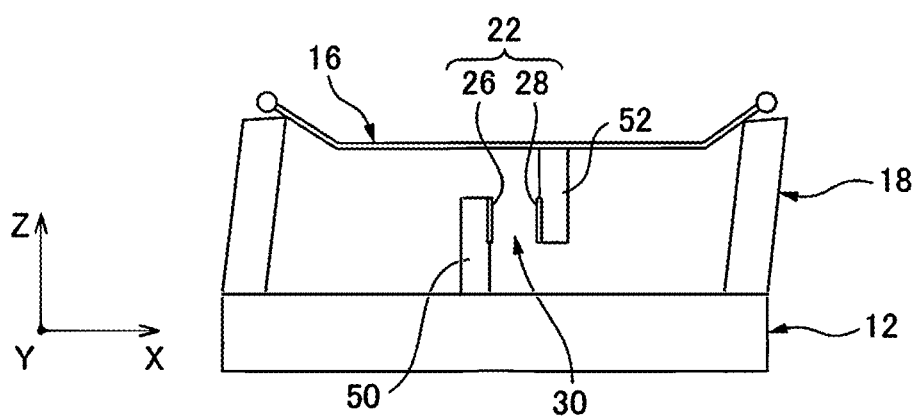
FIG. 2A is an illustration depicting an operation of a first detecting part of the six-axis force sensor.
Figure 2B:
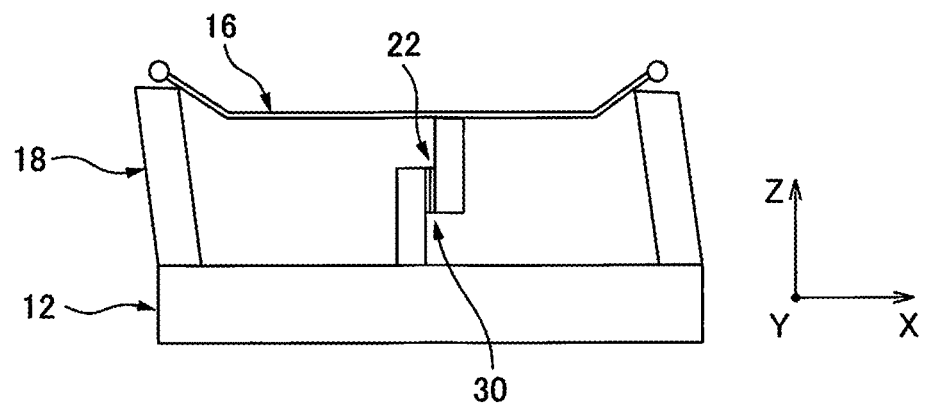
FIG. 2B is an illustration depicting the operation of the first detecting part of the six-axis force sensor.
Figure 2C:
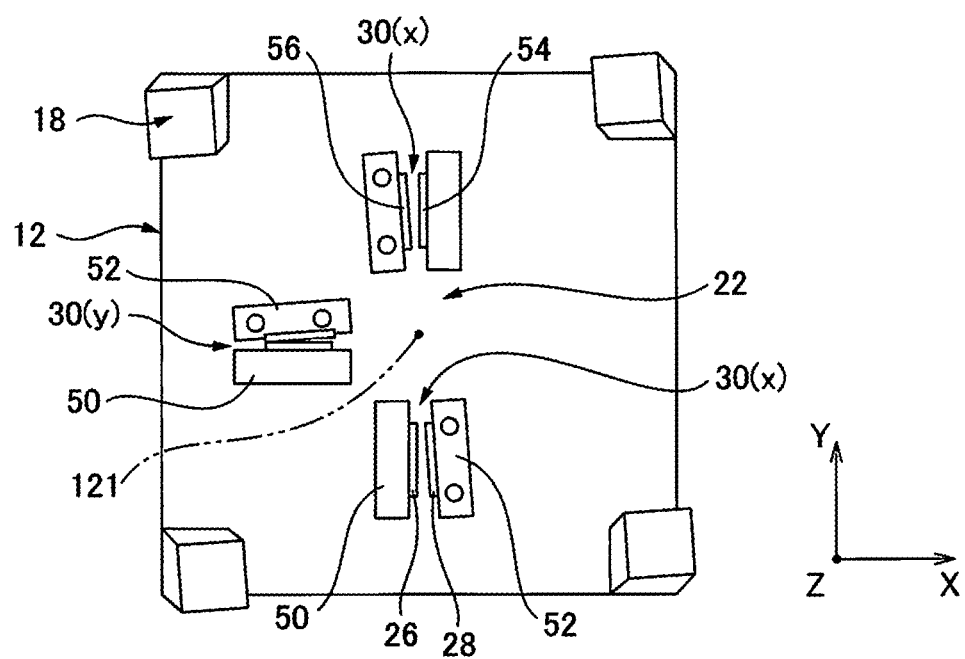
FIG. 2C is an illustration depicting the operation of the first detecting part of the six-axis force sensor.

FIGS. 2A to 2C schematically illustrate an example of the configuration and operation of the first detecting part 22. In the illustrated example, the first end portion 12 includes a first surface 26, the intermediate portion 16 includes a first intermediate surface 28 opposed to the first surface 26, and a first gap 30 is formed between the first surface 26 and the first intermediate surface 28, the first gap 30 having a dimension which changes in accordance with the relative displacement between the first end portion 12 and the intermediate portion 16. The first detecting part 22 detects a change in dimension of the first gap 30, and outputs the first detection value D1. For example, as illustrated in FIG. 2C, the first detecting part 22 may include two first gaps $30(x)$ for detecting a relative movement in the direction along the first axis (X axis), and one first gap $30(y)$ for detecting a relative movement in the direction along the second axis (Y axis) (FIGS. 2A and 2B illustrate only the first gap 30 along the first axis).

When the first end portion 12 and the intermediate portion 16 relatively move in the direction along the first axis (X axis), the dimension of the first gap $30(x)$ changes in accordance with the distance of the relative movement (FIGS. 2A and 2B). Similarly, when the first end portion 12 and the intermediate portion 16 relatively move in the direction along the second axis (Y axis), the dimension of the first gap $30(y)$ changes in accordance with the distance of the relative movement (not illustrated). On the other hand, when the first end portion 12 and the intermediate portion 16 relatively rotate about a central axis along the third axis (Z axis) (in the illustrated example, a central axis 121 of the first end portion 12 having a rectangular shape in plan view), the dimensions of the first gaps $30(x)$ and $30(y)$ change in accordance with the angle of the relative rotation (FIG. 2C). During the relative movement or rotation, the first end portion 12 and the intermediate portion 16 do not deform, and only the first connecting portion 18 elastically deforms.

The first gap 30 may have an electrostatic capacitance (hereinafter referred to as a capacitance), as one example of a constituent element for representing the change in dimension of the first gap 30 by a numerical quantity. In this configuration, in order to detect the relative displacement in connection with the aforementioned three directions, the first detecting part 22 may be provided for the first gap 30 with at least three capacitance-forming parts (i.e., pairs of electrodes) which are electrically independent from one another. In the example of FIG. 2C, each of the three first gaps 30 include a single capacitance-forming part. The first detecting part 22 detects a change in capacitance in each of the capacitance-forming parts, and thereby outputs the first detection value D1.

Figure 3A:
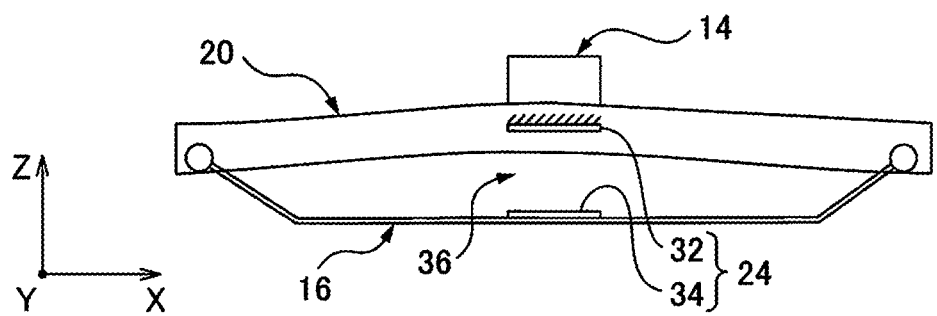
FIG. 3A is an illustration depicting an operation of a second detecting part of the six-axis force sensor.
Figure 3B:
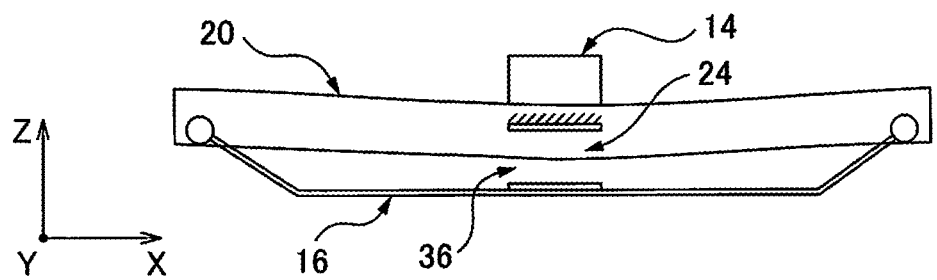
FIG. 3B is an illustration depicting the operation of the second detecting part of the six-axis force sensor.
Figure 3C:
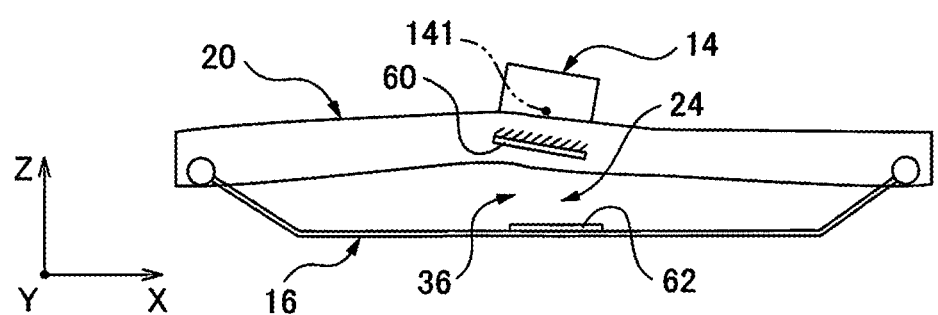
FIG. 3C is an illustration depicting the operation of the second detecting part of the six-axis force sensor.

FIGS. 3A to 3C schematically illustrate an example of the configuration and operation of the second detecting part 24. In the illustrated example, the second end portion 14 includes a second surface 32, the intermediate portion 16 includes a second intermediate surface 34 opposed to the second surface 32, and a second gap 36 is formed between the second surface 32 and the second intermediate surface 34, the second gap 36 having a dimension which changes in accordance with the relative displacement between the second end portion 14 and the intermediate portion 16. The second detecting part 24 detects a change in dimension of the second gap 36, and outputs the second detection value D2.

When the second end portion 14 and the intermediate portion 16 relatively move in the direction along the third axis (Z axis), the dimension of the second gap 36 changes in accordance with the distance of the relative movement (FIGS. 3A and 3B). On the other hand, when the second end portion 14 and the intermediate portion 16 relatively rotate about a central axis along the second axis (Y axis) (in the illustrated example, a central axis 141 in a rectangular vertical section of the second end portion 14 shaped like a rectangular parallelepiped), the dimension of the second gap 36 changes in accordance with the angle of the relative rotation (FIG. 3C). Similarly, when the second end portion 14 and the intermediate portion 16 relatively rotate about a central axis along the first axis (X axis), the dimension of the second gap 36 changes in accordance with the angle of the relative rotation (not illustrated). During the relative movement or rotation, the second end portion 14 and the intermediate portion 16 do not deform, and only the second connecting portion 20 elastically deforms.

The second gap 36 may have a capacitance, as one example of a constituent element for representing the change in dimension of the second gap 36 by a numerical quantity. In this configuration, in order to detect the relative displacement in connection with the aforementioned three directions, the second detecting part 24 may be provided for the second gap 36 with at least three capacitance-forming parts (i.e., pairs of electrodes) which are electrically independent from one another. The second detecting part 24 detects a change in capacitance in each of the capacitance-forming parts, and thereby outputs the second detection value D2.

In the six-axis force sensor 10, a constituent element for representing the change in dimension of the first gap 30 and the second gap 36 by a numerical quantity (i.e., a displacement detection element) is not limited to the capacitance. For example, the change in dimension can be represented by electromagnetic permeance, light quantity, air flow, etc., in the first gap 30 or the second gap 36. The first detecting part 22 may be provided with at least three detection element-forming parts that are independent from one another, and is configured to output the first detection value D1 by detecting a change in a displacement detection element in each of the detection element-forming parts. Similarly, the second detecting part 24 may be provided with at least three detection element-forming parts that are independent from one another, and is configured to output the second detection value D2 by detecting a change in a displacement detection element in each of the detection element-forming parts.

Figure 4:
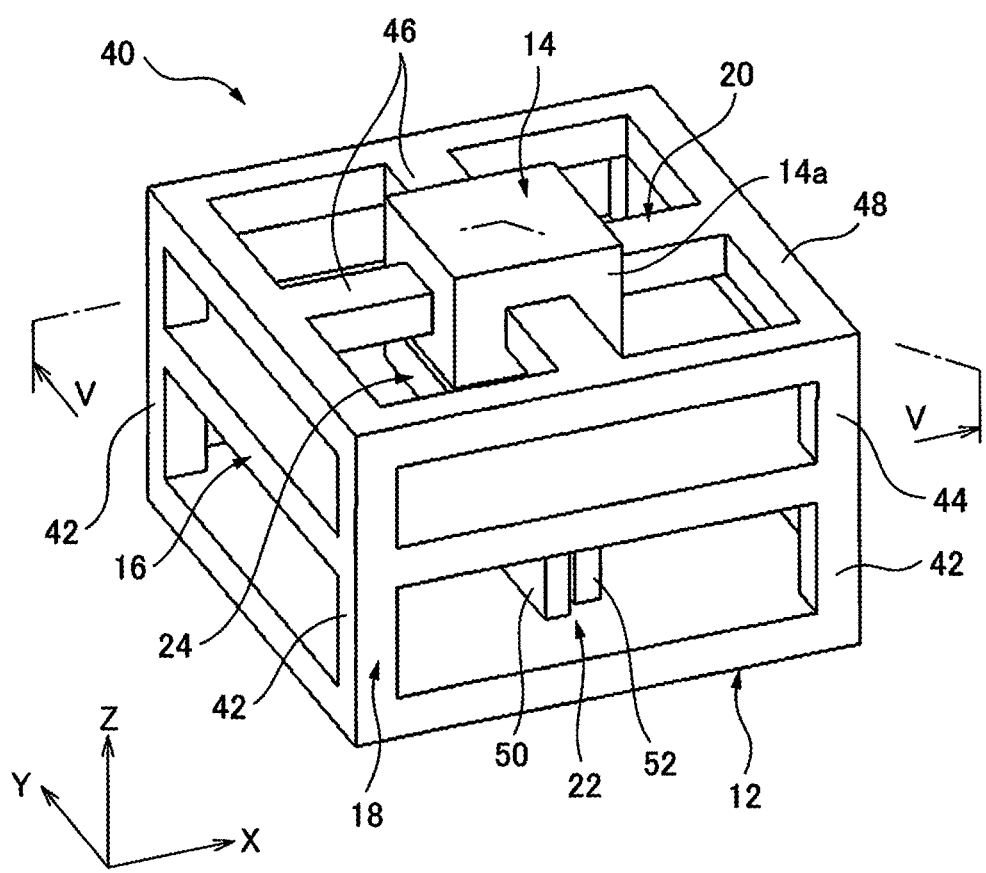
FIG. 4 is a perspective view illustrating an entire configuration of a six-axis force sensor according to a first embodiment.
Figure 5:
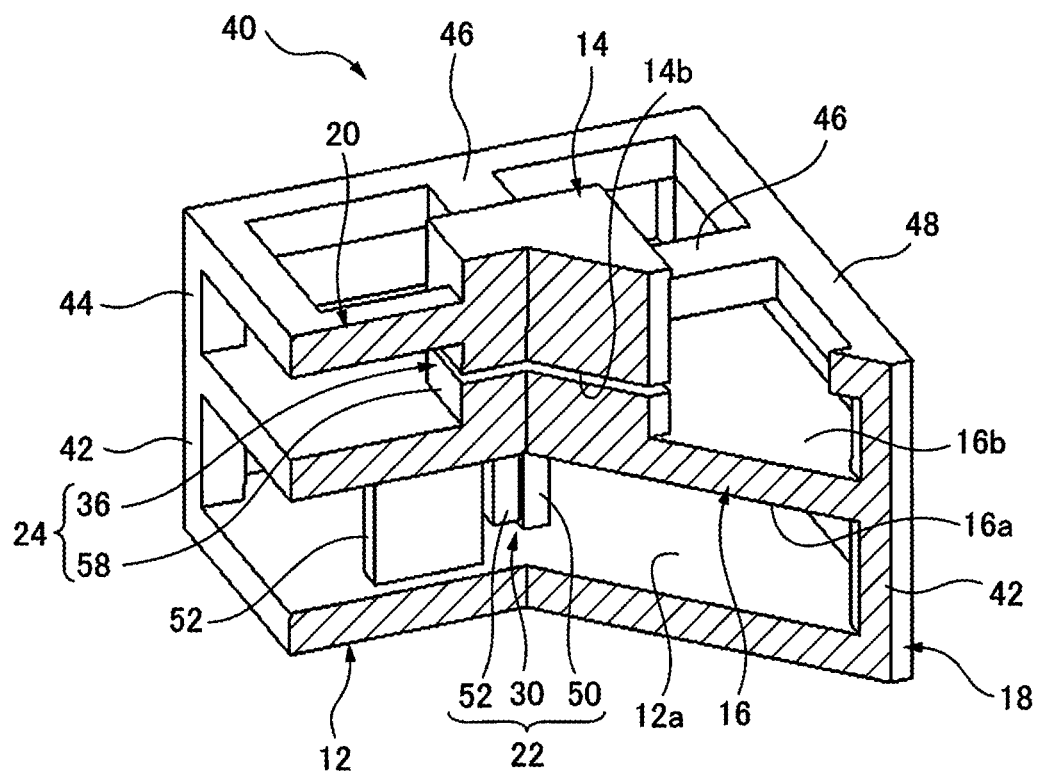
FIG. 5 is a cut-out perspective view taken along line V-V in FIG. 4.

FIGS. 4 and 5 illustrate a six-axis force sensor 40 according to a first embodiment. The characteristic configuration of the six-axis force sensor 10 or 40 of the present disclosure will be described in more detail below, with reference to FIGS. 1 to 5. Note that the six-axis force sensor 40 includes analogously the basic configuration of the aforementioned six-axis force sensor 10, and the corresponding constituent elements are denoted by common reference numerals in order to avoid a repeated description thereof. In the following description, a rectangular three-axis coordinate system (X-Y-Z) is defined for the six-axis force sensor 10, 40, and phrases such as "upper", "lower", etc., which indicate directionality in the drawings, are used for better understanding. These phrases, however, do not limit any directionality at the time of using the six-axis force sensor 10, 40.

The six-axis force sensor 40 includes a first end portion 12, a second end portion 14, an intermediate portion 16, a first connecting portion 18, a second connecting portion 20, a first detecting part 22, and a second detecting part 24. The first end portion 12 is shaped like a flat plate having a substantially square profile in plan view. The first end portion 12 includes a planar upper surface 12a extending along a virtual plane (X-Y plane) defined by the first axis (X axis) and the second axis (Y axis). A first elastic beam 42 having a columnar shape and extending in a direction along the third axis (Z axis), is provided at each of four corners of the upper surface 12a so as to upwardly project from the upper surface 12a. The first connecting portion 18 is composed of four first elastic beams 42.

The intermediate portion 16 is shaped like a flat plate having a substantially square profile in plan view, which corresponds to the shape of the first end portion 12. The intermediate portion 16 includes a planar lower surface 16a opposed to the upper surface 12a of the first end portion 12. Each of four first elastic beams 42 of the first connecting portion 18 is fixed, at the top end thereof, to the intermediate portion 16 at each of four corners of the lower surface 16a. The first end portion 12 and the intermediate portion 16 have rigidity capable of maintaining their own shapes against a force applied to the first end portion 12 or the second end portion 14.

In this embodiment, the rectangular coordinate system is defined in such a manner that, in an equilibrium state free from elastic deformation of the first connecting portion 18, the first axis (X axis) and the second axis (Y axis) are disposed parallel to the four sides of the substantially square upper and lower surfaces 12a and 16a, and the third axis (Z axis) is disposed parallel to an axis passing through the centers of the upper and lower surfaces 12a and 16a. Note that the shapes of the first end portion 12 and the intermediate portion 16 are not limited to the illustrated rectangular flat plate, and may be, for example, a circular disc or other polygon.

Each of four first elastic beams 42 is constructed so as not to be easily deformed (i.e., elongated or contracted) by a force in a direction parallel to the third axis (Z axis), but to be elastically bent, as if a column inclines, by a force in a direction parallel to the first axis (X axis), a force in a direction parallel to the second axis (Y axis), or a force in a rotational direction about the third axis (Z axis). When a force is applied to the first end portion 12 or the second end portion 14, four first elastic beams 42 exclusively exhibit the above elastic deformation, because of the rigidity of the first end portion 12 and the intermediate portion 16. When the first elastic beams 42 elastically deform by receiving the aforementioned force, the first end portion 12 and the intermediate portion 16 cause a relative movement in a direction along a virtual plane (X-Y plane) involving the first axis (X axis) and the second axis (Y axis), or a relative rotation about a central axis along the third axis (Z axis).

Each first elastic beam 42 may have a rectangular columnar shape as illustrated, or have various other shapes such as a circular column or other polygonal columns. More specifically, each first elastic beam 42 may have an entirely uniform thickness as illustrated, or have a thinner or thicker center length or a thinner or thicker end length, or have combined curved outer surfaces. Four first elastic beams 42 may have an equal length as illustrated, or have mutually different lengths. In the case where four first elastic beams 42 have an equal length, the upper surface 12a of the first end portion 12 and the lower surface 16a of the intermediate portion 16 are disposed in parallel.

The positions of the first elastic beams 42 are not limited to the four corners of the upper surface 12a of the first end portion 12, and may be arranged, for example, at any points along the four sides of the upper surface 12a. The number of the first elastic beams 42 is not limited to four, and may be three, or five or more. The first connecting portion 18 just needs to enable the displacement between the first end portion 12 and the intermediate portion 16 in the aforementioned three-degrees of freedom, and based on this premise, a desired number of first elastic beams 42 may be provided at desired positions.

The intermediate portion 16 includes a planar upper surface 16b on the side opposite to the lower surface 16a. An upright rigid column 44 extending in a direction along the third axis (Z axis) is provided at each of four corners of the upper surface 16b. Each of four rigid columns 44 is disposed so as to be linearly aligned with each of four first elastic beams 42 in the direction along the third axis (Z axis).

The second end portion 14 is shaped like a rectangular parallelepiped having a substantially square profile in plan view. The second end portion 14 includes four planar lateral faces 14a extending along a virtual plane (X-Z plane) defined by the first axis (X axis) and the third axis (Z axis) and a virtual plane (Y-Z plane) defined by the second axis (Y axis) and the third axis (Z axis). A second elastic beam 46 having a rod shape and extending in a direction along the first axis (X axis) or the second axis (Y axis), is provided at a substantially center of each of the lateral faces 14a so as to laterally project from the lateral face 14a. The second connecting portion 20 is composed of four second elastic beams 46. Note that the shape of the second end portion 14 is not limited to the illustrated rectangular parallelepiped, and may be, for example, a circular disc or other polygon.

Four second elastic beams 46 are joined to a rigid frame 48 at their distal ends opposite to the second end portion 14. The rigid frame 48 has a substantially square profile in plan view, which corresponds to that of the intermediate portion 16. The distal ends of the second elastic beams 46 are fixed to the rigid frame at positions corresponding to the centers of four sides of the profile. The rigid frame 48 is fixed, at its four corners, to the top ends of four rigid columns 44. The fixation between the rigid frame 48 and the rigid columns 44 may be accomplished, for example, jointly with the fixation between the intermediate portion 16 and the first elastic beams 42, by bolts (not illustrated) commonly used for both fixations. The rigid frame 48 may also be fixed to the second elastic beams 46 by using bolts (not illustrated). The second end portion 14, the rigid columns 44 and the rigid frame 48 have rigidity capable of maintaining their own shapes against a force applied to the first end portion 12 or the second end portion 14. Note that the profile of the rigid frame 48 is not limited to the illustrated substantially square, and may be, for example, a circular disc or other polygon correspondingly to the shape of the intermediate portion 16.

Among four second elastic beams 46, each of two second elastic beams 46 extending in the direction along the first axis (X axis) is constructed so as not to be easily deformed (i.e., elongated or contracted) by a force in a direction parallel to the first axis (X axis), but to be elastically bent, as if a column inclines, by a force in a direction parallel to the third axis (Z axis), a force in a rotational direction about the first axis (X axis), or a force in a rotational direction about the second axis (Y axis). Similarly, each of two second elastic beams 46 extending in the direction along the second axis (Y axis) is constructed so as not to be easily deformed (i.e., elongated or contracted) by a force in a direction parallel to the second axis (Y axis), but to be elastically bent, as if a column inclines, by a force in a direction parallel to the third axis (Z axis), a force in a rotational direction about the first axis (X axis), or a force in a rotational direction about the second axis (Y axis). When a force is applied to the first end portion 12 or the second end portion 14, four second elastic beams 46 exclusively exhibit the above elastic deformation, because of the rigidity of the second end portion 14, the rigid columns 44, the rigid frame 48 and the intermediate portion 16. The second elastic beams 46 elastically deform by receiving the aforementioned force, and thereby the second end portion 14 and the intermediate portion 16 cause a relative movement in a direction along the third axis (Z axis), or a relative rotation about a central axis along a virtual plane (X-Y plane) involving the first axis (X axis) and the second axis (Y axis).

Each second elastic beam 46 may have a rectangular columnar shape as illustrated, or have various other shapes such as a circular column or other polygonal columns. More specifically, each second elastic beam 46 may have an entirely uniform thickness as illustrated, or have a thinner or thicker center length or a thinner or thicker end length, or have combined curved outer surfaces. Four second elastic beams 46 may have an equal length as illustrated, or have mutually different lengths. In addition, four second elastic beams 46 may extend in directions perpendicular to one another as illustrated, or extend in directions crossing at angles other than right angle.

The positions of the second elastic beams 46 are not limited to the substantially centers of respective lateral faces 14a of the second end portion 14, and may be arranged at proper points on the lateral faces 14a. The number of the second elastic beams 46 is not limited to four, and may be three, or five or more. For example, the second elastic beams 46 may be provided on three of four lateral faces 14a of the second end portion 14. The second connecting portion 20 just needs to enable the displacement between the second end portion 14 and the intermediate portion 16 in the aforementioned three-degrees of freedom, and based on this premise, a desired number of second elastic beams 46 may be provided at desired positions.

In the six-axis force sensor 40, due to the aforementioned configuration of the first end portion 12, the second end portion 14, the intermediate portion 16, the first connecting portion 18 (first elastic beams 42), the rigid columns 44, the second connecting portion 20 (second elastic beams 46) and the rigid frame 48, the force applied to the first end portion 12 or the second end portion 14 is then applied to both of the first connecting portion 18 and the second connecting portion 20 without propagating through the intermediate portion 16 between the first connecting portion 18 and the second connecting portion 20. For example, in the case where the first end portion 12 is used as a base element and the second end portion 14 is used as a force receiving element, the force (or load) applied from a force generator to the second end portion 14 is then applied from the second end portion 14 to the second connecting portion 20, so as to elastically deform, depending on the direction of the force, the second connecting portion 20 in a direction defined by the aforementioned second three-degrees of freedom. The force applied to the second connecting portion 20 is transmitted to the rigid frame 48 and the rigid columns 44, and is then applied to the first connecting portion 18 without deforming the rigid frame 48 and the rigid columns 44 and without propagating through the intermediate portion 16, so as to elastically deform, depending on the direction of the force, the first connecting portion 18 in a direction defined by the aforementioned first three-degrees of freedom.

In the six-axis force sensor 40, a first gap 30 having a capacitance is formed between the first end portion 12 and the intermediate portion 16. The first detecting part 22 detects a change in capacitance in the first gap 30, and thereby detects a relative displacement between the first end portion 12 and the intermediate portion 16. Also, in the six-axis force sensor 40, a second gap 36 having a capacitance is formed between the second end portion 14 and the intermediate portion 16. The second detecting part 24 detects a change in capacitance in the second gap 36, and thereby detects a relative displacement between the second end portion 14 and the intermediate portion 16.

The configuration of the first detecting part 22 of the six-axis force sensor 40 will be described with reference to FIGS. 4 and 5 as well as FIGS. 2A to 2C. The first end portion 12 is provided with three first blocks 50, each protruding from the upper surface 12a in a direction along the third axis (Z axis). Each first block 50 is shaped like a rectangular parallelepiped, and is disposed at a predetermined position on the upper surface 12a. One first block 50 includes a first surface 26 extending along a virtual plane (X-Z plane) defined by the first axis (X axis) and the third axis (Z axis). Each of the other two first blocks 50 includes a first surface 26 extending along a virtual plane (Y-Z plane) defined by the second axis (Y axis) and the third axis (Z axis).

The intermediate portion 16 is provided with three first intermediate blocks 52, each protruding from the lower surface 16a in a direction along the third axis (Z axis). Each first intermediate block 52 is shaped like a rectangular parallelepiped, and is disposed at a predetermined position on the lower surface 16a, which corresponds to the position of each first block 50. One first intermediate block 52 includes a first intermediate surface 28 extending along a virtual plane (X-Z plane) defined by the first axis (X axis) and the third axis (Z axis). Each of the other two first intermediate blocks 52 includes a first intermediate surface 28 extending along a virtual plane (Y-Z plane) defined by the second axis (Y axis) and the third axis (Z axis).

The first surface 26 and the first intermediate surface 28, which extend along the same virtual plane at a mutually corresponding position, are disposed to be opposed substantially in parallel to each other in a state where the first connecting portion 18 is not elastically deformed. In each of three pairs of the mutually opposed first surface 26 and first intermediate surface 28, the first gap 30 is formed between the surfaces 26 and 28. In the state where the first connecting portion 18 does not elastically deform, three first gaps 30 can have mutually identical shape and dimension.

The first detecting part 22 includes three or more capacitance-forming parts that are electrically independent from one another and provided in three first gaps 30. Each capacitance-forming part is composed of an electrode 54 (FIG. 2C) formed on the first surface 26 of one first block 50 and an electrode 56 (FIG. 2C) formed on the first intermediate surface 28 of one opposed first intermediate block 52. The first gap 30 provides electrical insulation between the mutually opposed electrodes 54 and 56 (i.e., an electrode pair), and a predetermined capacitance is formed in the first gap 30 by the electrodes 54 and 56.

In the six-axis force sensor 40, when the first end portion 12 and the intermediate portion 16 move relative to each other in a direction along the first axis (X axis), the first surface 26 and the first intermediate surface 28, which are opposed in a direction of the first axis (X axis), are translated relative to each other (or make a translation or parallel displacement) in a direction toward or away from each other, so as to uniformly decease or increase the first gap 30 (FIGS. 2A and 2B). As a result, the capacitances respectively provided in two pairs of electrodes 54 and 56 facing each other in the direction of the first axis (X axis), change in a mode corresponding to each other. The first detecting part 22 detects the changes in the corresponding mode in the capacitances, and outputs, based on the detected changes, a detection value (i.e., the first detection value D1) representing the relative movement between the first end portion 12 and the intermediate portion 16 in the direction along the first axis (X axis). Similarly, when the first end portion 12 and the intermediate portion 16 move relative to each other in a direction along the second axis (Y axis), the first surface 26 and the first intermediate surface 28, which are opposed in a direction of the second axis (Y axis), are translated relative to each other (or make a translation or parallel displacement) in a direction toward or away from each other, so as to uniformly decease or increase the first gap 30 (not illustrated). As a result, the capacitance provide in the single pair of electrodes 54 and 56 facing each other in the direction of the second axis (Y axis), changes. The first detecting part 22 detects the change in the capacitance, and outputs, based on the detected change, a detection value (i.e., the first detection value D1) representing the relative movement between the first end portion 12 and the intermediate portion 16 in the direction along the second axis (Y axis).

When the first end portion 12 and the intermediate portion 16 rotate relative to each other about a central axis 121 (FIG. 2C) along the third axis (Z axis), the first surface 26 and the first intermediate surface 28, which are opposed in a direction of the first axis (X axis), are inclined relative to each other, and the first surface 26 and the first intermediate surface 28, which are opposed in a direction of the second axis (Y axis), are inclined relative to each other, so that each first gap 30 is decreased at one end region and increased at the other end region in the electrode pair (FIG. 2C). As a result, the capacitances respectively provided in two pairs of electrodes 54 and 56 facing each other in the direction of the first axis (X axis), change in a mode corresponding to each other, while the capacitance provided in the single pair of electrodes 54 and 56 facing each other in the direction of the second axis (Y axis), changes in a mode different from the mode in the direction of the X axis. The first detecting part 22 detects the changes in the different modes in the capacitances, and outputs, based on the detected changes, a detection value (i.e., the first detection value D1) representing the relative rotation between the first end portion 12 and the intermediate portion 16 about the central axis 121 along the third axis (Z axis).

When the first end portion 12 and the intermediate portion 16 are displaced relative to each other in a synthetic direction that is a composition of two or more directions, from among the direction along the first axis (X axis), the direction along the second axis (Y axis) and the direction about a central axis along the third axis (Z axis), the first detecting part 22 can likewise detect the changes in the capacitances in two pairs of electrodes 54 and 56 facing each other in the direction of the first axis (X axis) and the change in the capacitance in one pair of electrodes 54 and 56 facing each other in the direction of the second axis (Y axis), and output, based on the detected changes, the first detection value D1 representing a component in the direction along the first axis (X axis), a component in the direction along the second axis (Y axis) and a component about the central axis along the third axis (Z axis), of a relative displacement between the first end portion 12 and the intermediate portion 16.

Next, the configuration of the second detecting part 24 of the six-axis force sensor 40 will be described with reference to FIGS. 4 and 5 as well as FIGS. 3A to 3C. The second end portion 14 includes, in its lower surface 14b opposed to the intermediate portion 16, a second surface 32 extending along a virtual plane (X-Y plane) defined by the first axis (X axis) and the second axis (Y axis). The intermediate portion 16 is provided with a single second block 58 protruding from the upper surface 16b in a direction along the third axis (Z axis). The second block 58 is shaped like a rectangular parallelepiped, and is disposed at a predetermined position on the upper surface 16b, which corresponds to the position of the second end portion 14. The second block 58 includes a second intermediate surface 34 extending along a virtual plane (X-Y plane) defined by the first axis (X axis) and the second axis (Y axis). The second surface 32 and the second intermediate surface 34 are disposed to be opposed substantially in parallel to each other in a state where the second connecting portion 20 is not elastically deformed. The second gap 36 is formed between the mutually opposed second intermediate surface 34 and second surface 32.

The second detecting part 24 includes three or more capacitance-forming parts that are electrically independent from one another and provided in the second gap 36. Each capacitance-forming part is composed of an electrode 60 (FIG. 3C) formed on the second surface 32 and an electrode 62 (FIG. 3C) formed on the second intermediate surface 34. The second gap 36 provides electrical insulation between the mutually opposed electrodes 60 and 62 (i.e., an electrode pair), and a predetermined capacitance is formed in the second gap 36 by the electrodes 60 and 62. Although not illustrated, in this embodiment, three electrodes 60, each having a fan-shaped profile and located adjacent to each other in a circumferential direction, are formed on the second surface 32, and three electrodes 62, each having a fan-shaped profile and located adjacent to each other in a circumferential direction, are formed on the second intermediate surface 34. In each of three pairs of electrodes 60 and 62 facing each other in a direction of the third axis (Z axis), the electrodes 60 and 62 are disposed at positions where their profiles are registered with each other as viewed in the direction of the third axis. Thus, three capacitances are formed in the second gap 36 by three pairs of electrodes 60 and 62.

In the six-axis force sensor 40, when the second end portion 14 and the intermediate portion 16 move relative to each other in a direction along the third axis (Z axis), the second surface 32 and the second intermediate surface 34, which are opposed in a direction of the third axis (Z axis), are translated relative to each other (or make a parallel displacement) in a direction toward or away from each other, so as to uniformly decease or increase the second gap 36 (FIGS. 3A and 3B). As a result, the capacitances respectively provided in three pairs of electrodes 60 and 62 facing each other in the direction of the third axis (Z axis), change in a mode corresponding to each other. The second detecting part 24 detects the changes in the corresponding mode in the capacitances, and outputs, based on the detected changes, a detection value (i.e., the second detection value D2) representing the relative movement between the second end portion 14 and the intermediate portion 16 in the direction along the third axis (Z axis).

When the second end portion 14 and the intermediate portion 16 rotate relative to each other about a central axis 141 (FIG. 3C) along the second axis (Y axis), the second surface 32 and the second intermediate surface 34 are inclined relative to each other, so that the second gap 36 is decreased at one end region and increased at the other end region in the electrode pairs (FIG. 3C). As a result, the capacitances respectively provided in three pairs of electrodes 60 and 62 facing each other in the direction of the third axis (Z axis), change in a mode different from one another. The second detecting part 24 detects the changes in the different modes in the capacitances, and outputs, based on the detected changes, a detection value (i.e., the second detection value D2) representing the relative rotation between the second end portion 14 and the intermediate portion 16 about the central axis 141 along the second axis (Y axis). Similarly, when the second end portion 14 and the intermediate portion 16 rotate relative to each other about a central axis (not illustrated) along the first axis (X axis), the second surface 32 and the second intermediate surface 34 are inclined relative to each other, so that the second gap 36 is decreased at one end region and increased at the other end region (not illustrated) in the electrode pairs. As a result, the capacitances respectively provided in three pairs of electrodes 60 and 62 facing each other in the direction of the third axis (Z axis), change in a mode different from one another. The second detecting part 24 detects the changes in the different modes in the capacitances, and outputs, based on the detected changes, a detection value (i.e., the second detection value D2) representing the relative rotation between the second end portion 14 and the intermediate portion 16 about the central axis along the first axis (X axis).

When the second end portion 14 and the intermediate portion 16 are displaced relative to each other in a synthetic direction that is a composition of two or more directions, from among the direction about a central axis along the first axis (X axis), the direction about a central axis along the second axis (Y axis) and the direction along the third axis (Z axis), the second detecting part 24 can likewise detect the changes in the capacitances in three pairs of electrodes 60 and 62 facing each other in the direction of the third axis (Z axis), and output, based on the detected changes, the second detection value D2 representing a component in the direction about the central axis along the first axis (X axis), a component in the direction about the central axis along the second axis (Y axis) and a component along the third axis (Z axis), of a relative displacement between the second end portion 14 and the intermediate portion 16.

As described above, the six-axis force sensor 10, 40 has a configuration wherein the first end portion 12 and the intermediate portion 16 are mutually connected by the first connecting portion 18 with the first three-degrees of freedom and the second end portion 14 and the intermediate portion 16 are mutually connected by the second connecting portion 20 with the second three-degrees of freedom different from the first three-degrees of freedom, and wherein the first detecting part 22 detects the relative displacement between the first end portion 12 and the intermediate portion 16 in the first three-degrees of freedom and the second detecting part 24 different from the first detecting part 22 detects the relative displacement between the second end portion 14 and the intermediate portion 16 in the second three-degrees of freedom. Accordingly, the first detecting part 22 and the second detecting part 24 can detect, in a sharing manner, the relative displacement between the first end portion 12 and the second end portion 14 in six-degrees of freedom, with the first detecting part 22 being allocated to three-degrees of freedom and the second detecting part 24 being allocated to the other three-degrees of freedom. Since the first detecting part 22 and the second detecting part 24 can respectively output, in a sharing manner, the first detection value D1 based on the relative displacement in the first three-degrees of freedom and the second detection value D2 based on the relative displacement in the second three-degrees of freedom, it is possible to improve accuracy in the first detection value D1 and the second detection value D2, used for acquiring three-axis force components and three-axis moment components.

In particular, the six-axis force sensor 10, 40 has the aforementioned configuration wherein the force applied to the first end portion 12 or the second end portion 14, is then applied to both of the first connecting portion 18 and the second connecting portion 20, without propagating through the intermediate portion 16 between the first connecting portion 18 and the second connecting portion 20. Accordingly, for example, in the case where the first end portion 12 is used as a base element and the second end portion 14 is used as a force receiving element, during a period when a force (or load) applied from a force generator to the second end portion 14 elastically deforms the second connecting portion 20 in a direction defined by the aforementioned second three-degrees of freedom (i.e., the rotation about a central axis along the first axis, the rotation about a central axis along the second axis and the translation along the third axis), components of the applied force in other directions are applied to the first connecting portion 18 without propagating through the intermediate portion 16, so as to elastically deform the first connecting portion 18 in a direction defined by the aforementioned first three-degrees of freedom (i.e., the translation along the first axis, the translation along the second axis and the rotation about a central axis along the third axis). Thus, the components of the force applied to the second connecting portion 20, which do not deform the second connecting portion 20 (i.e., the force and moment components in the first three-degrees of freedom), deform the first connecting portion 18 without propagating through the intermediate portion 16. Consequently, even if a load exceeding the rigidity of the intermediate portion 16 occurs during a period when the second end portion 14 is displaced relative to the intermediate portion 16, it is possible to prevent the intermediate portion 16 from being unintentionally deformed due to the excessive load. As a result, the relative displacement between the second end portion 14 and the intermediate portion 16 and the relative displacement between the first end portion 12 and the intermediate portion 16 exactly correspond to the respective force and moment components, shared with the respective three-degrees of freedom, of the force applied to the second end portion 14. In this manner, in the six-axis force sensor 10, 40, it is possible to eliminate the influence of a load exerted on the intermediate portion 16 due to the displacement of the first end portion 12 or the second end portion 14, and thereby output the first detection value D1 and the second detection value D2 with high precision.

Figure 6:
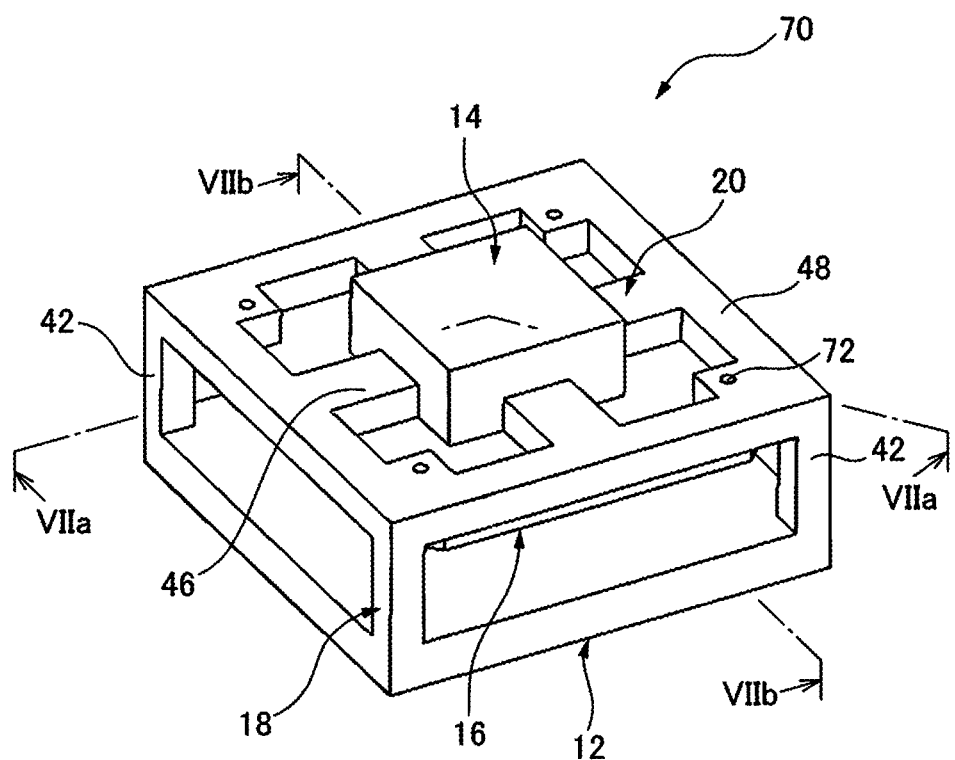
FIG. 6 is a perspective view illustrating an entire configuration of a six-axis force sensor according to a second embodiment.
Figure 7A:
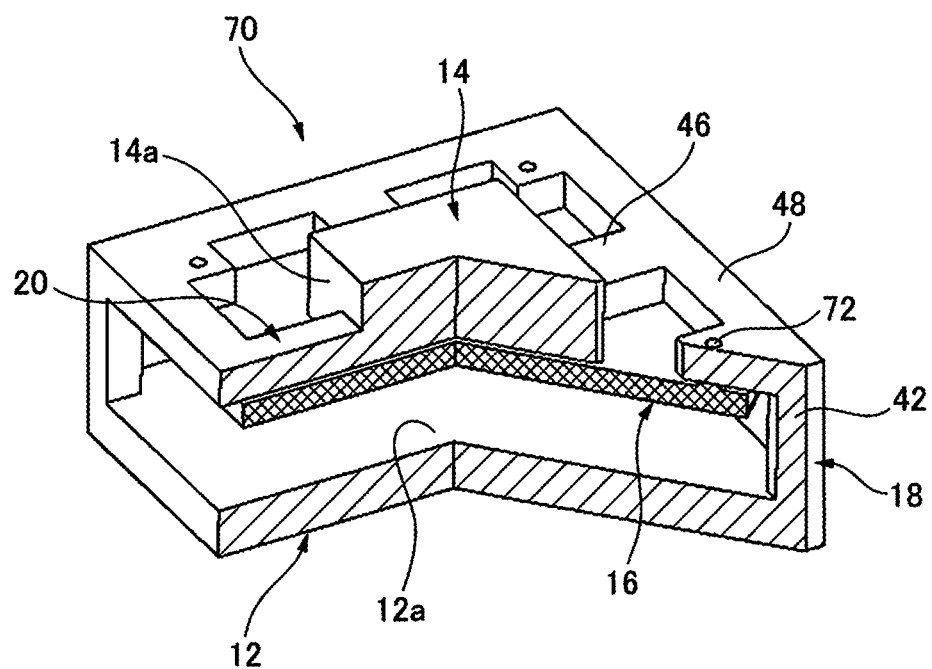
FIG. 7A is a cut-out perspective view taken along line VIIa-VIIa in FIG. 6.
Figure 7B:
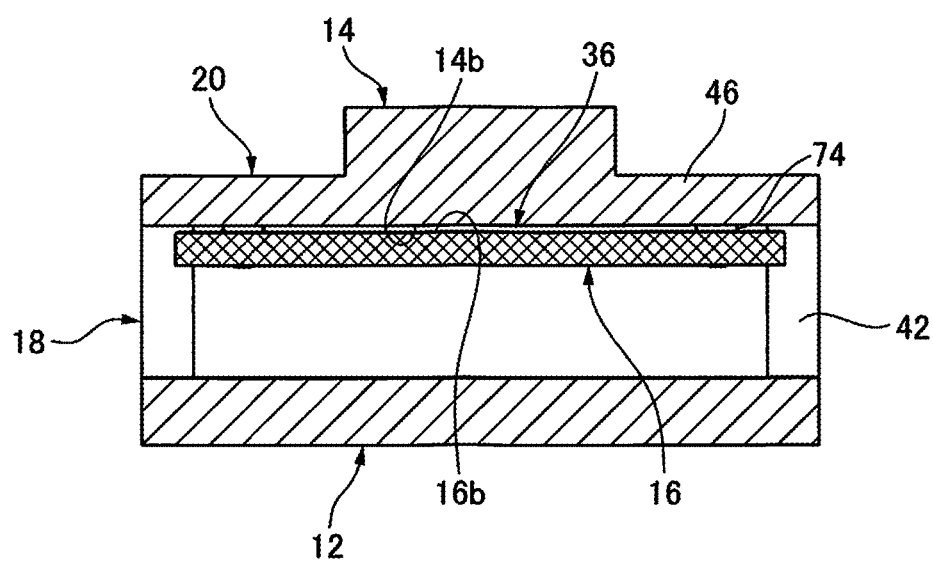
FIG. 7B is a sectional view taken along line VIIb-VIIb in FIG. 6.

FIGS. 6 to 7B illustrate a six-axis force sensor 70 according to a second embodiment. The six-axis force sensor 70 has a configuration analogous to that of the aforementioned six-axis force sensor 40, except for a structural relationship between an intermediate portion 16, a first connecting portion 18 and a second connecting portion 20. Thus, corresponding constituent elements are denoted by common reference numerals in order to avoid a repeated description thereof. Note that a first detecting part 22 and a second detecting part 24 are not illustrated in FIGS. 6 to 7B.

The six-axis force sensor 70 includes a first end portion 12, a second end portion 14, an intermediate portion 16, a first connecting portion 18, a second connecting portion 20, a first detecting part 22 (FIG. 4), and a second detecting part 24 (FIG. 4). The first end portion 12 is shaped like a flat plate having a substantially square profile in plan view. First elastic beams 42 each having a columnar shape, which constitute the first connecting portion 18, are respectively provided at four corners of the upper surface 12a of the first end portion 12 so as to upwardly project from the upper surface 12a. Each of the first elastic beams 42 is fixed, at the top end thereof, to each of four corners of a rigid frame 48. In the six-axis force sensor 70, the rigid columns 44 of the aforementioned six-axis force sensor 40 are eliminated.

The intermediate portion 16 is shaped like a flat plate having a substantially square profile in plan view, which is smaller than the first end portion 12 but corresponds to the profile of the first end portion 12. Unlike the aforementioned six-axis force sensor 40, the intermediate portion 16 is not directly joined to four first elastic beams 42 of the first connecting portion 18. Instead, the intermediate portion 16 is fixed to four corners of the rigid frame 48 by using, for example, bolts 72, in the vicinity of the respective first elastic beams 42.

The second end portion 14 is shaped like a rectangular parallelepiped having a substantially square profile in plan view. Second elastic beams 46 each having a rod shape, which constitute the second connecting portion 20, are respectively provided on four lateral faces 14a of the second end portion 14 so as to laterally project from the lateral faces 14a. Each of the second elastic beams 46 is joined to the rigid frame 48 at the distal end thereof opposite to the second end portion 14. The first end portion 12, the second end portion 14, the intermediate portion 16 and the rigid frame 48 have rigidity capable of maintaining their own shapes against a force applied to the first end portion 12 or the second end portion 14.

Analogously to the six-axis force sensor 40, the six-axis force sensor 70 has a configuration wherein a force applied to the first end portion 12 or the second end portion 14 is then applied to both of the first connecting portion 18 (or the first elastic beams 42) and the second connecting portion 20 (or the second elastic beams 46), without propagating through the intermediate portion 16 between the first connecting portion 18 and the second connecting portion 20. For example, in the case where the first end portion 12 is used as a base element and the second end portion 14 is used as a force receiving element, a force (or load) applied from a force generator to the second end portion 14 is then applied from the second end portion 14 to the second connecting portion 20, so as to elastically deform, depending on the direction of the force, the second connecting portion 20 in a direction defined by second three-degrees of freedom (i.e., a rotation about a central axis along a first axis (X axis), a rotation about a central axis along a second axis (Y axis) and a translation along a third axis (Z axis)). The force applied to the second connecting portion 20 is transmitted to the rigid frame 48, and is then applied to the first connecting portion 18 without deforming the rigid frame 48 and without propagating through the intermediate portion 16, so as to elastically deform, depending on the direction of the force, the first connecting portion 18 in a direction defined by first three-degrees of freedom (i.e., a translation along the first axis (X axis), a translation along the second axis (Y axis) and a rotation about a central axis along the third axis (Z axis)).

Although not illustrated, the first detecting part 22 and the second detecting part 24 of the six-axis force sensor 70 have configurations analogous to those of the first detecting part 22 and the second detecting part 24 of the aforementioned six-axis force sensor 40. Note that, however, the six-axis force sensor 70 does not include the second block 58, which is provided on the upper surface 16b of the intermediate portion 16 in the force sensor 40, and a second gap 36 is formed between the lower surface 14b (i.e., a second surface 32) of the second end portion 14 and the upper surface 16b (i.e., a second intermediate surface 34) of the intermediate portion 16 (FIG. 7B). A part (e.g., bolt 72) fixing the intermediate portion 16 to the rigid frame 48 may be provided with a spacer 74 (FIG. 7B) interposed between the intermediate portion 16 and the rigid frame 48. The dimension of the second gap 36 can be adjusted by the spacer 74.

Analogously to the six-axis force sensor 10 or 40, the six-axis force sensor 70 has a configuration wherein the first detecting part 22 and the second detecting part 24 can respectively output, in a sharing manner, a first detection value D1 based on the relative displacement in the first three-degrees of freedom and a second detection value D2 based on the relative displacement in the second three-degrees of freedom, so that it is possible to improve accuracy in the first detection value D1 and the second detection value D2, used for acquiring three-axis force components and three-axis moment components. Also, analogously to the six-axis force sensor 10 or 40, the six-axis force sensor 70 has a configuration wherein a force applied to the first end portion 12 or the second end portion 14 is applied to both of the first connecting portion 18 and the second connecting portion 20 without propagating through the intermediate portion 16 between the first connecting portion 18 and the second connecting portion 20, so that it is possible to eliminate the influence of a load exerted on the intermediate portion 16 due to the displacement of the first end portion 12 or the second end portion 14, and thereby output the first detection value D1 and the second detection value D2 with high precision.

Figure 8:
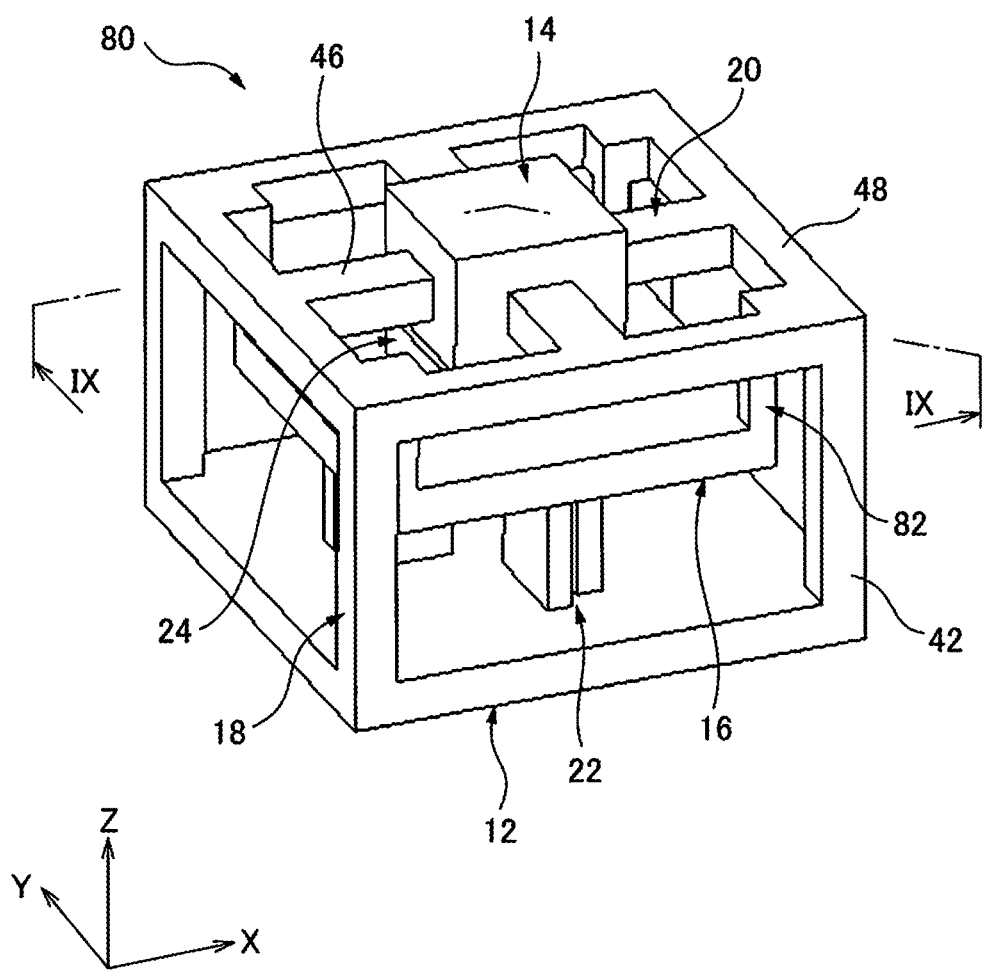
FIG. 8 is a perspective view illustrating an entire configuration of a six-axis force sensor according to a third embodiment.
Figure 9:
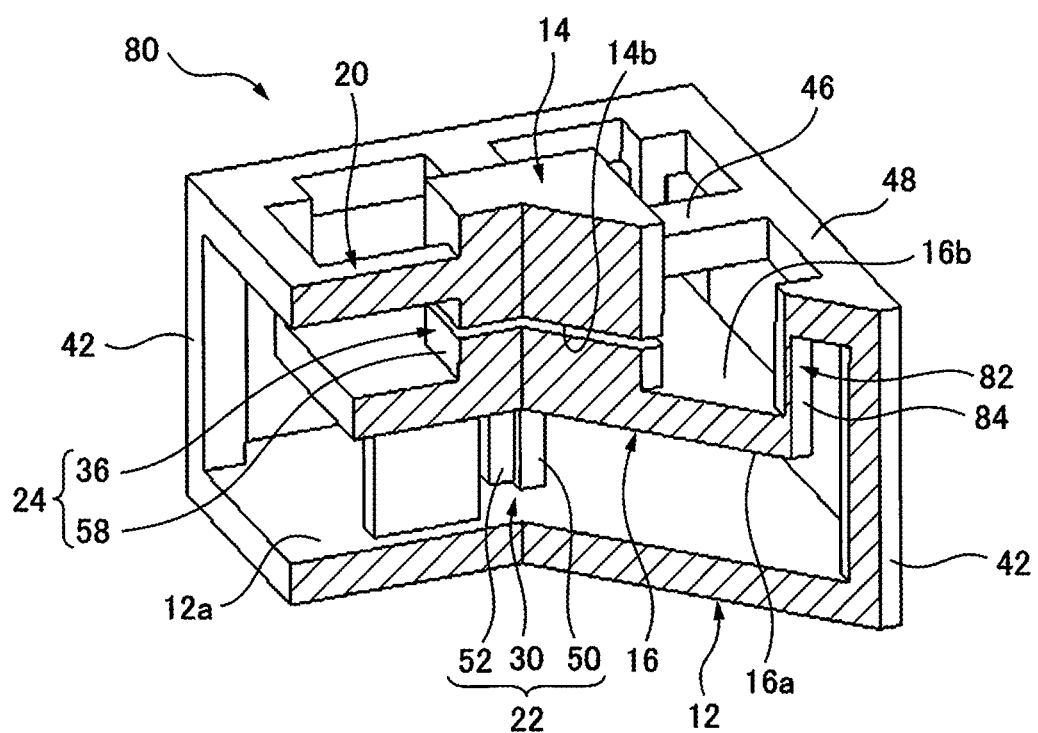
FIG. 9 is a cut-out perspective view taken along line IX-IX in FIG. 8.
Figure 10:
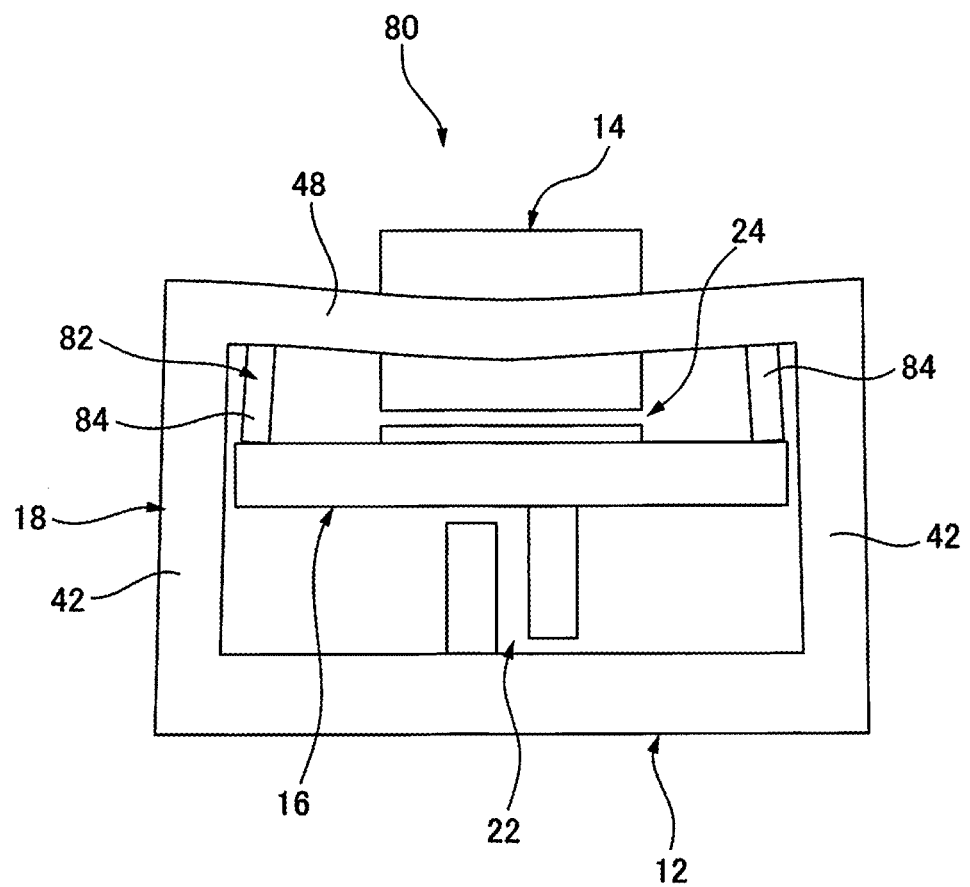
FIG. 10 is an illustration depicting an operation of the six-axis force sensor of FIG. 8.

FIGS. 8 to 10 illustrate a six-axis force sensor 80 according to a third embodiment. The six-axis force sensor 80 has a configuration analogous to that of the aforementioned six-axis force sensor 40 or 70, except for a structural relationship between an intermediate portion 16, a first connecting portion 18 and a second connecting portion 20. Thus, corresponding constituent elements are denoted by common reference numerals in order to avoid a repeated description thereof.

The six-axis force sensor 80 includes a first end portion 12, a second end portion 14, an intermediate portion 16, a first connecting portion 18, a second connecting portion 20, a first detecting part 22 and a second detecting part 24. The first end portion 12 is shaped like a flat plate having a substantially square profile in plan view. First elastic beams 42 each having a columnar shape, which constitute the first connecting portion 18, are respectively provided at four corners of the upper surface 12a of the first end portion 12 so as to upwardly project from the upper surface 12a. Each of the first elastic beams 42 is fixed, at the top end thereof, to each of four corners of a rigid frame 48. In the six-axis force sensor 80, the rigid columns 44 of the aforementioned six-axis force sensor 40 are eliminated.

The intermediate portion 16 is shaped like a flat plate having a substantially square profile in plan view, which is smaller than the first end portion 12 but corresponds to the profile of the first end portion 12. Unlike the aforementioned six-axis force sensor 40, the intermediate portion 16 is not directly joined to four first elastic beams 42 of the first connecting portion 18. Instead, the intermediate portion 16 is connected to four corners of the rigid frame 48 via an auxiliary connecting portion 82 in the vicinity of the respective first elastic beams 42.

The auxiliary connecting portion 82 is disposed between the intermediate portion 16 and the first connecting portion 18. When the second connecting portion 20 is elastically deformed by a force applied to the first end portion 12 or the second end portion 14, the auxiliary connecting portion 82 elastically deforms depending on the elastic deformation of the second connecting portion 20. In the illustrated embodiment, third elastic beams 84, each having a columnar shape and extending in a direction along a third axis (Z axis), are respectively provided at four corners of the upper surface 16b of the intermediate portion 16 so as to upwardly projecting from the upper surface 16b. The auxiliary connecting portion 82 is composed of the third elastic beams 84. Each of the third elastic beams 84 is fixed, at the top end thereof, to each of four corners of the rigid frame 48 at a location apart from the first elastic beam 42.

The second end portion 14 is shaped like a rectangular parallelepiped having a substantially square profile in plan view. Second elastic beams 46 each having a rod shape, which constitute the second connecting portion 20, are respectively provided on four lateral faces 14a of the second end portion 14 so as to laterally project from the lateral faces 14a. Each of the second elastic beams 46 is joined to the rigid frame 48 at the distal end thereof opposite to the second end portion 14. The first end portion 12, the second end portion 14, the intermediate portion 16 and the rigid frame 48 have rigidity capable of maintaining their own shapes against a force applied to the first end portion 12 or the second end portion 14.

Analogously to the six-axis force sensor 40 or 70, the six-axis force sensor 80 has a configuration wherein a force applied to the first end portion 12 or the second end portion 14 is then applied to both of the first connecting portion 18 (or the first elastic beams 42) and the second connecting portion 20 (or the second elastic beams 46), without propagating through the intermediate portion 16 between the first connecting portion 18 and the second connecting portion 20. For example, in the case where the first end portion 12 is used as a base element and the second end portion 14 is used as a force receiving element, a force (or load) applied from a force generator to the second end portion 14 is then applied from the second end portion 14 to the second connecting portion 20, so as to elastically deform, depending on the direction of the force, the second connecting portion 20 in a direction defined by second three-degrees of freedom (i.e., a rotation about a central axis along a first axis (X axis), a rotation about a central axis along a second axis (Y axis) and a translation along a third axis (Z axis)). The force applied to the second connecting portion 20 is transmitted to the rigid frame 48, and is then applied to the first connecting portion 18 without deforming the rigid frame 48 and without propagating through the intermediate portion 16, so as to elastically deform, depending on the direction of the force, the first connecting portion 18 in a direction defined by first three-degrees of freedom (i.e., a translation along the first axis (X axis), a translation along the second axis (Y axis) and a rotation about a central axis along the third axis (Z axis)).

In the above example, when the force applied to the second connecting portion 20 is transmitted to the rigid frame 48, the rigid frame 48 may be slightly deformed, depending on the magnitude of the force. If the rigid frame 48 is deformed, it is concerned that a load is applied from the rigid frame 48 to the intermediate portion 16 and an unintended deformation occurs in the intermediate portion 16. If the intermediate portion 16 is deformed, it is concerned about deterioration of accuracy in a first detection value D1 of the first detecting part 22 and a second detection value D2 of the second detecting part 24. In the six-axis force sensor 80, when such an unintended load occurs in accordance with the elastic deformation of the second connecting portion 20, the auxiliary connecting portion 82 (or the third elastic beams 84) elastically deforms depending on the load, and thereby prevents the load from being applied from the rigid frame 48 to the intermediate portion 16 (FIG. 10).

The first detecting part 22 and the second detecting part 24 of the six-axis force sensor 80 have configurations analogous to those of the first detecting part 22 and the second detecting part 24 of the aforementioned six-axis force sensor 40. In summary, first gaps 30 are formed respectively between three first blocks 50 provided on the upper surface 12a of the first end portion 12 and three first intermediate blocks 52 provided on the lower surface 16a of the intermediate portion 16. The first detecting part 22 detects a change in dimension of each first gap 30 based on a capacitance, etc., and thereby outputs the first detection value D1. Also, a second gap 36 is formed between the lower surface 14b of the second end portion 14 and a second block 58 provided on the upper surface 16b of the intermediate portion 16. The second detecting part 24 detects a change in dimension of the second gap 36 based on a capacitance, etc., and thereby outputs the second detection value D2.

Analogously to the six-axis force sensor 10, 40 or 70, the six-axis force sensor 80 has a configuration wherein the first detecting part 22 and the second detecting part 24 can respectively output, in a sharing manner, the first detection value D1 based on the relative displacement in the first three-degrees of freedom and the second detection value D2 based on the relative displacement in the second three-degrees of freedom, so that it is possible to improve accuracy in the first detection value D1 and the second detection value D2, used for acquiring three-axis force components and three-axis moment components. Also, analogously to the six-axis force sensor 10, 40 or 70, the six-axis force sensor 80 has a configuration wherein a force applied to the first end portion 12 or the second end portion 14 is applied to both of the first connecting portion 18 and the second connecting portion 20 without propagating through the intermediate portion 16 between the first connecting portion 18 and the second connecting portion 20, so that it is possible to eliminate the influence of a load exerted on the intermediate portion 16 due to the displacement of the first end portion 12 or the second end portion 14, and thereby output the first detection value D1 and the second detection value D2 with high precision.

Figure 11:
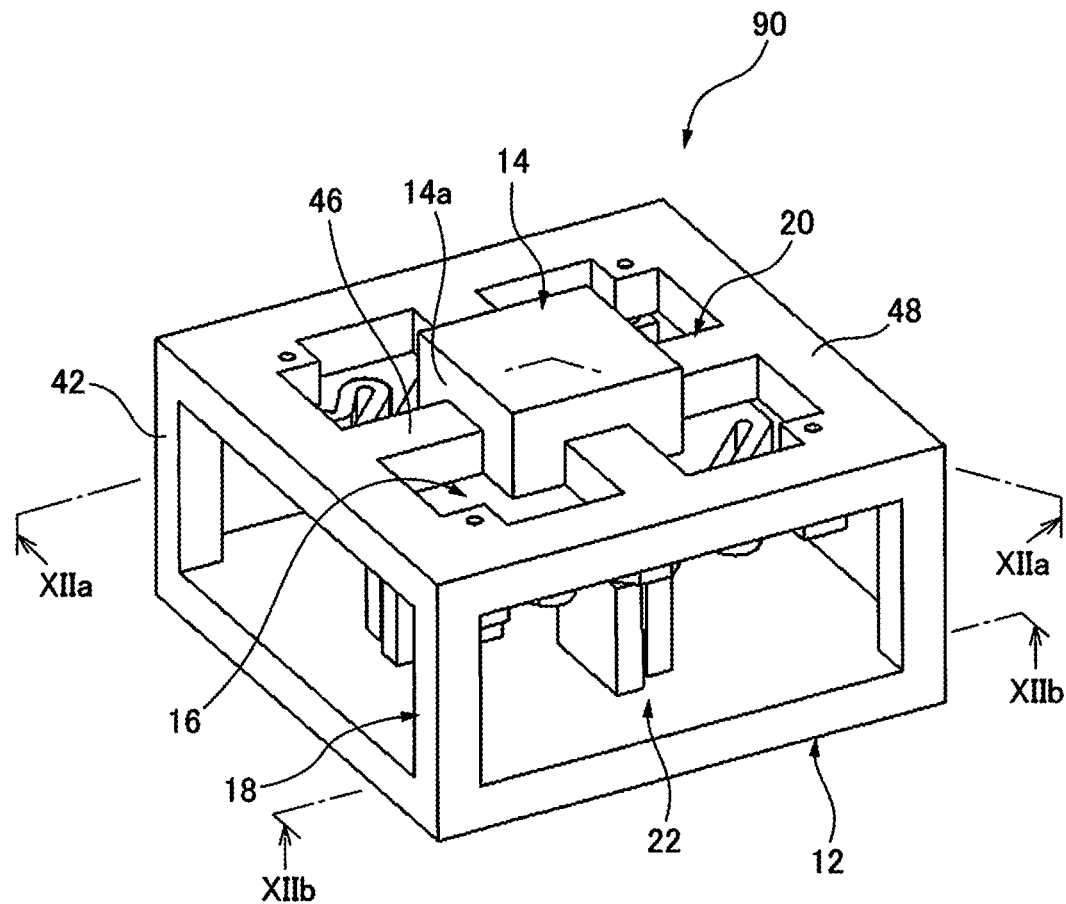
FIG. 11 is a perspective view illustrating an entire configuration of a six-axis force sensor according to a fourth embodiment.
Figure 12A:
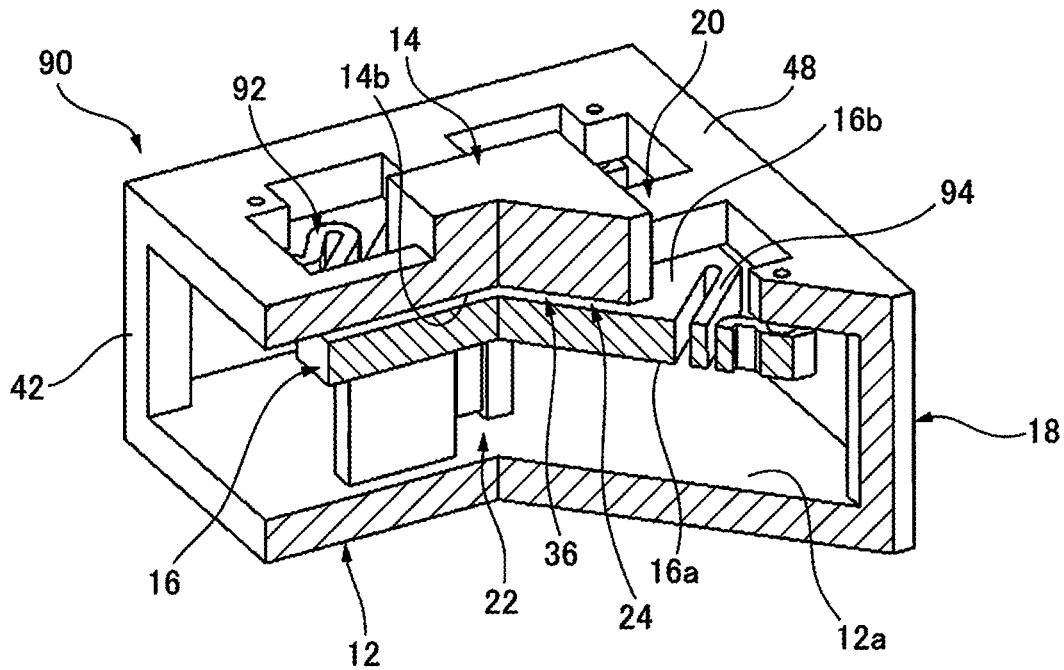
FIG. 12A is a cut-out perspective view taken along line XIIa-XIIa in FIG. 11.
Figure 12B:
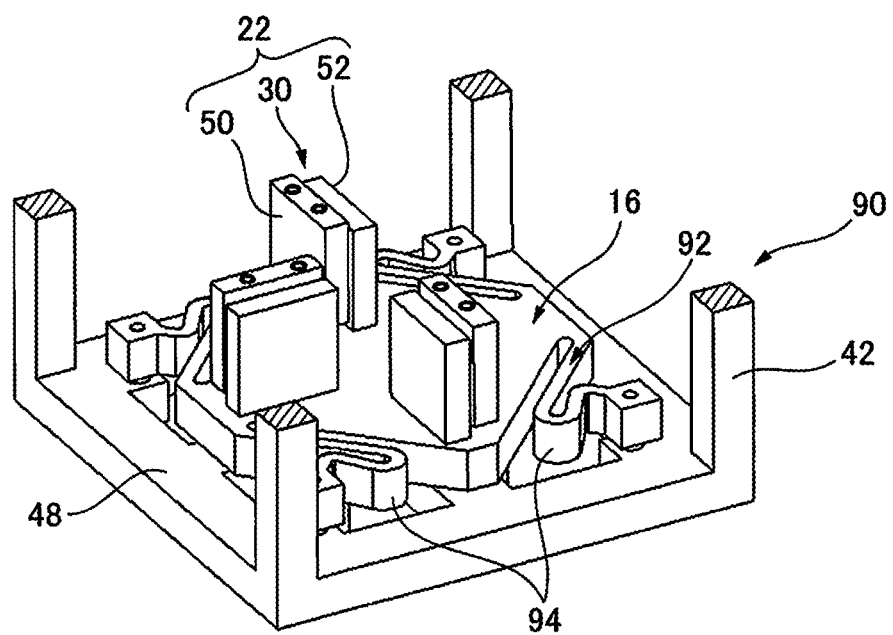
FIG. 12B is a cut-out perspective view taken along line XIIb-XIIb in FIG. 11.

FIGS. 11 to 12B illustrate a six-axis force sensor 90 according to a fourth embodiment. The six-axis force sensor 90 has a configuration analogous to that of the aforementioned six-axis force sensor 40, 70 or 80, except for a structural relationship between an intermediate portion 16, a first connecting portion 18 and a second connecting portion 20. Thus, corresponding constituent elements are denoted by common reference numerals in order to avoid a repeated description thereof.

The six-axis force sensor 90 includes a first end portion 12, a second end portion 14, an intermediate portion 16, a first connecting portion 18, a second connecting portion 20, a first detecting part 22 and a second detecting part 24. The first end portion 12 is shaped like a flat plate having a substantially square profile in plan view. First elastic beams 42 each having a columnar shape, which constitute the first connecting portion 18, are respectively provided at four corners of the upper surface 12a of the first end portion 12 so as to upwardly project from the upper surface 12a. Each of the first elastic beams 42 is fixed, at the top end thereof, to each of four corners of a rigid frame 48. In the six-axis force sensor 90, the rigid columns 44 of the aforementioned six-axis force sensor 40 are eliminated.

The intermediate portion 16 is shaped like a flat plate having a substantially square profile in plan view, which is smaller than the first end portion 12 but corresponds to the profile of the first end portion 12. Unlike the aforementioned six-axis force sensor 40, the intermediate portion 16 is not directly joined to four first elastic beams 42 of the first connecting portion 18. Instead, the intermediate portion 16 is connected to four corners of the rigid frame 48 via an auxiliary connecting portion 92 in the vicinity of the respective first elastic beams 42.

The auxiliary connecting portion 92 is disposed between the intermediate portion 16 and the first connecting portion 18. When the second connecting portion 20 is elastically deformed by a force applied to the first end portion 12 or the second end portion 14, the auxiliary connecting portion 92 elastically deforms depending on the elastic deformation of the second connecting portion 20. In the illustrated embodiment, fourth elastic beams 94, each having a spring function and meanderingly extending in a direction along a virtual plane (X-Y plane) involving a first axis (X axis) and a second axis (Y axis), are respectively provided on four corners of the intermediate portion 16 so as to laterally project from the four corners. The auxiliary connecting portion 92 is composed of the fourth elastic beams 94. Each of the fourth elastic beams 94 is fixed, at the distal end thereof opposite to the intermediate portion 16, to each of four corners of the rigid frame 48 at a location apart from the first elastic beam 42.

The second end portion 14 is shaped like a rectangular parallelepiped having a substantially square profile in plan view. Second elastic beams 46 each having a rod shape, which constitute the second connecting portion 20, are respectively provided on four lateral faces 14a of the second end portion 14 so as to laterally project from the lateral faces 14a. Each of the second elastic beams 46 is joined to the rigid frame 48 at the distal end thereof opposite to the second end portion 14. The first end portion 12, the second end portion 14, the intermediate portion 16 and the rigid frame 48 have rigidity capable of maintaining their own shapes against a force applied to the first end portion 12 or the second end portion 14.

Analogously to the six-axis force sensor 40, 70 or 80, the six-axis force sensor 90 has a configuration wherein a force applied to the first end portion 12 or the second end portion 14 is then applied to both of the first connecting portion 18 (or the first elastic beams 42) and the second connecting portion 20 (or the second elastic beams 46), without propagating through the intermediate portion 16 between the first connecting portion 18 and second connecting portion 20. For example, in the case where the first end portion 12 is used as a base element and the second end portion 14 is used as a force receiving element, a force (or load) applied from a force generator to the second end portion 14 is then applied from the second end portion 14 to the second connecting portion 20, so as to elastically deform, depending on the direction of the force, the second connecting portion 20 in a direction defined by second three-degrees of freedom (i.e., a rotation about a central axis along a first axis (X axis), a rotation about a central axis along a second axis (Y axis) and a translation along a third axis (Z axis)). The force applied to the second connecting portion 20 is transmitted to the rigid frame 48, and is then applied to the first connecting portion 18 without deforming the rigid frame 48 and without propagating through the intermediate portion 16, so as to elastically deform, depending on the direction of the force, the first connecting portion 18 in a direction defined by first three-degrees of freedom (i.e., a translation along the first axis (X axis), a translation along the second axis (Y axis) and a rotation about a central axis along the third axis (Z axis)).

In the above example, when the force applied to the second connecting portion 20 is transmitted to the rigid frame 48, the rigid frame 48 may be slightly deformed, depending on the magnitude of the force. If the rigid frame 48 is deformed, it is concerned that a load is applied from the rigid frame 48 to the intermediate portion 16 and an unintended deformation occurs in the intermediate portion 16. If the intermediate portion 16 is deformed, it is concerned about deterioration of accuracy in a first detection value D1 of the first detecting part 22 and a second detection value D2 of the second detecting part 24. In the six-axis force sensor 90, when such an unintended load occurs in accordance with the elastic deformation of the second connecting portion 20, the auxiliary connecting portion 92 (or the fourth elastic beams 94) elastically deforms depending on the load, and thereby prevents the load from being applied from the rigid frame 48 to the intermediate portion 16, in a manner analogous to the six-axis force sensor 80.

The first detecting part 22 and the second detecting part 24 of the six-axis force sensor 90 have configurations analogous to those of the first detecting part 22 and the second detecting part 24 of the aforementioned six-axis force sensor 40. In summary, first gaps 30 are formed respectively between three first blocks 50 provided on the upper surface 12a of the first end portion 12 and three first intermediate blocks 52 provided on the lower surface 16a of the intermediate portion 16. The first detecting part 22 detects a change in dimension of each first gap 30 based on a capacitance, etc., and thereby outputs the first detection value D1. Also, a second gap 36 is formed between the lower surface 14b of the second end portion 14 and the upper surface 16b of the intermediate portion 16. The second detecting part 24 detects a change in dimension of the second gap 36 based on a capacitance, etc., and thereby outputs the second detection value D2.

Analogously to the six-axis force sensor 10, 40, 70 or 80, the six-axis force sensor 90 has a configuration wherein the first detecting part 22 and the second detecting part 24 can respectively output, in a sharing manner, the first detection value D1 based on the relative displacement in the first three-degrees of freedom and the second detection value D2 based on the relative displacement in the second three-degrees of freedom, so that it is possible to improve accuracy in the first detection value D1 and the second detection value D2, used for acquiring three-axis force components and three-axis moment components. Also, analogously to the six-axis force sensor 10, 40, 70 or 80, the six-axis force sensor 90 has a configuration wherein a force applied to the first end portion 12 or the second end portion 14 is applied to both of the first connecting portion 18 and the second connecting portion 20 without propagating through the intermediate portion 16 between the first connecting portion 18 and the second connecting portion 20, so that it is possible to eliminate the influence of a load exerted on the intermediate portion 16 due to the displacement of the first end portion 12 or the second end portion 14, and thereby output the first detection value D1 and the second detection value D2 with high precision.

The six-axis force sensor 10, 40, 70, 80 or 90 is configured to enable a detection of the aforementioned first force component, second force component, third force component, first moment component, second moment component and third moment component, of a force applied to the first end portion 12 or the second end portion 14, based on the first detection value D1 obtained by the first detecting part 22 and the second detection value D2 obtained by the second detecting part 24. The detection of the force and moment components can be implemented by a calculating device provided separately from the six-axis force sensor 10, 40, 70, 80, 90. Alternatively, as illustrated in FIG. 1, the six-axis force sensor 10, 40, 70, 80, 90 may be provided in itself with a calculating part 100 which calculates the first force component, the second force component, the third force component, the first moment component, the second moment component and the third moment component, of a force applied to the first end portion 12 or the second end portion 14, by using the first detection value D1 detected by the first detecting part 22 and the second detection value D2 detected by the second detecting part 24.

The calculation for calculating the force and moment components from the first detection value D1 and the second detection value D2 can be executed, for example, by a method of performing a matrix calculation between the detection values D1, D2 and a transform coefficient matrix obtained in advance. The transform coefficient matrix can be obtained by applying a known load to the six-axis force sensor 10, 40, 70, 80, 90 in various directions, collecting displacement data corresponding to the force and moment components of the applied load along the six axes, and executing a known mathematical method relative to the collected displacement data. In the aforementioned configuration wherein a capacitance is used for a displacement detection, the capacitance is inversely proportional to the dimension of each of the first gap 30 and the second gap 36, so that the first detecting part 22 and the second detecting part 24 can obtain a displacement amount from an inverse number of detected change in the capacitance and output the first detection value D1 and the second detection value D2 based on the obtained displacement amount. Alternatively, by using a known mathematical method, the calculating part 100, for instance, may directly obtain the force and moment components, based on the raw data of the change in capacitance detected by the first detecting part 22 and the second detecting part 24 (i.e., the detected value of the capacitance). In this case, the first detecting part 22 and the second detecting part 24 output the detected changes in the respective capacitances as the first detection value D1 and the second detection value D2.

In the six-axis force sensor 10, 40, 70, 80 or 90, the directions of the first three-degrees of freedom achieved by the first connecting portion 18 and the directions of the second three-degrees of freedom achieved by the second connecting portion 20 do not necessarily correspond exactly to the X axis, Y axis and Z axis of a rectangular coordinate system. For example, in the first three-degrees of freedom which define the relative displacement between the first end portion 12 and the intermediate portion 16, the case where the direction of movement along the first axis (X axis) and the direction of movement along the second axis (Y axis) are not orthogonal, may cause a crosstalk term in a data calculation process. However, in this case, the calculating part 100, for instance, can detect the displacement amount along the first axis (X axis) and the displacement amount along the second axis (Y axis) independently from each other, by using an angle defined between the movement directions. Also, the case where the central axis along the third axis (Z axis) is not orthogonal relative to the virtual plane (X-Y plane) involving the first axis (X axis) and the second axis (Y axis), may make the first detection value D1 and the second detection value D2 not to be independent from each other. However, in this case, the calculating part 100, for instance, can correct the detection values D1 and D2 by using an angle defined between the virtual plane and the central axis.

Furthermore, as described in connection with the six-axis force sensors 80 and 90, in the case where, for example, a load is applied to the intermediate portion 16 due to the deformation of the rigid frame 48, it may be possible to maintain accuracy in the first detection value D1 and the second detection value D2 by, for example, a calculation process in the calculating part 100, in place of a structural measure such as the auxiliary connecting portion 82, 92. In this configuration, for example, the calculating part 100 can apply a correction value calculated by using the second detection value D2 output from the second detecting part 24, to the first detection value D1 output from the first detecting part 22, and calculate the force and moment components based on the corrected first detection value D1. The calculation of the correction value may be performed by, for example, a digital calculation for A/D-converted second detection value D2.

While the embodiments of the disclosure have been described, it will be understood, by those skilled in the art, that various changes or modifications may be made thereto without departing from the scope of the following claims.

The invention claimed is:

1. A six-axis force sensor comprising:
 a first end portion;
 a second end portion;
 an intermediate portion between the first end portion and the second end portion;
 a first connecting portion that elastically connects the first end portion to the intermediate portion with first three-degrees of freedom;

a second connecting portion that elastically connects the second end portion to the intermediate portion with second three-degrees of freedom;

a first detecting part that detects a relative displacement between the first end portion and the intermediate portion, accompanied by elastic deformation of the first connecting portion, and outputs, based on the said relative displacement, a first detection value used for acquiring a first force component in a direction of a first axis, a second force component in a direction of a second axis orthogonal to the first axis, and a third moment component about a third axis orthogonal to both of the first axis and the second axis, of a force applied to the first end portion or the second end portion; and a second detecting part that detects a relative displacement between the second end portion and the intermediate portion, accompanied by elastic deformation of the second connecting portion, and outputs, based on the said relative displacement, a second detection value used for acquiring a first moment component about the first axis, a second moment component about the second axis, and a third force component in a direction of the third axis, of the said force;

wherein the intermediate portion, the first connecting portion and the second connecting portion are disposed in such a manner that the said force is applied to both of the first connecting portion and the second connecting portion without propagating through the intermediate portion between the first connecting portion and the second connecting portion.

2. The six-axis force sensor of claim 1, further comprising a calculating part that calculates the first force component, the second force component, the third force component, the first moment component, the second moment component and the third moment component, by using the first detection value and the second detection value.

3. The six-axis force sensor of claim 1, wherein the first end portion includes a first surface, the intermediate portion includes a first intermediate surface opposed to the first surface, and a first gap having a capacitance is formed between the first surface and the first intermediate surface; and wherein the first detecting part detects a change in the capacitance of the first gap and thereby outputs the first detection value.

4. The six-axis force sensor of claim 1, wherein the second end portion includes a second surface, the intermediate portion includes a second intermediate surface opposed to the second surface, and a second gap having a capacitance is formed between the second surface and the second intermediate surface; and wherein the second detecting part detects a change in the capacitance of the second gap and thereby outputs the second detection value.

5. The six-axis force sensor of claim 1, wherein the first connecting portion includes a plurality of first elastic beams extending in a direction along the third axis between the first end portion and the intermediate portion; and wherein each of the first elastic beams elastically deforms, due to the said force applied thereto, in such a manner that the first end portion and the intermediate portion cause a relative movement in a direction along a virtual plane involving the first axis and the second axis, or a relative rotation about a central axis along the third axis.

6. The six-axis force sensor of claim 1, wherein the second connecting portion includes a plurality of second elastic beams extending in a direction along the first axis or the second axis between the second end portion and the intermediate portion; and wherein each of the second elastic beams elastically deforms, due to the said force applied thereto, in such a manner that the second end portion and the intermediate portion cause a relative movement in a direction along the third axis, or a relative rotation about a central axis along a virtual plane involving the first axis and the second axis.

7. The six-axis force sensor of claim 1, further comprising an auxiliary connecting portion disposed between the intermediate portion and the first connecting portion, wherein the auxiliary connecting portion elastically deforms in accordance with elastic deformation of the second connecting portion caused due to the said force.

8. The six-axis force sensor according to claim 1, wherein the first end portion and second end portion face each other, and the first detecting part and the second detecting part are attached to the intermediate portion on opposing surfaces of the intermediate portion.

* * * * *